United States Patent [19]

Mombo-Caristan

[11] Patent Number: 5,595,670

[45] Date of Patent: Jan. 21, 1997

[54] METHOD OF HIGH SPEED HIGH POWER WELDING

[75] Inventor: Jean C. Mombo-Caristan, Troy, Mich.

[73] Assignee: The Twentyfirst Century Corporation, Troy, Mich.

[21] Appl. No.: 395,480

[22] Filed: Apr. 17, 1995

[51] Int. Cl.$^6$ ............................ B23K 26/06; B23K 15/00
[52] U.S. Cl. ................................. 219/121.64; 219/121.14
[58] Field of Search ........................ 219/121.13, 121.14, 219/121.25, 121.26, 121.64, 121.63, 121.73, 121.74, 121.75, 121.61

[56] References Cited

U.S. PATENT DOCUMENTS

| | | | |
|---|---|---|---|
| 3,159,419 | 12/1964 | Kerby . | |
| 3,881,084 | 4/1975 | Baardsen | 219/121.64 |
| 4,379,219 | 4/1983 | Behrens et al. | 219/121.63 |
| 4,591,688 | 5/1986 | Koch et al. . | |
| 4,628,179 | 12/1986 | Crahay . | |
| 4,650,954 | 3/1987 | Frings et al. . | |
| 4,656,332 | 4/1987 | Gross et al. . | |
| 4,667,080 | 5/1987 | Jüptner et al. . | |
| 4,769,522 | 9/1988 | Lentz et al. . | |
| 4,827,100 | 5/1989 | Frings et al. | 219/121.64 |
| 4,902,872 | 2/1990 | Frings et al. | 219/121.63 |
| 4,942,285 | 7/1990 | Ishikawa et al. | 219/121.64 |
| 4,945,202 | 7/1990 | Büdenbender | 219/121.63 |
| 4,990,741 | 2/1991 | Moores et al. | 219/121.64 |
| 5,245,156 | 9/1993 | Kamogawa et al. | 219/121.64 |
| 5,250,783 | 10/1993 | Nishi et al. | 219/121.64 |
| 5,347,528 | 9/1994 | Haruta et al. | 372/25 |

FOREIGN PATENT DOCUMENTS

| | | | |
|---|---|---|---|
| 0429368 | 5/1991 | European Pat. Off. | 219/121.75 |
| 594210 | 4/1994 | European Pat. Off. . | |
| 54-18441 | 2/1979 | Japan | 219/121.14 |
| 54-112352 | 9/1979 | Japan | 219/121.14 |
| 57-36084 | 2/1982 | Japan | 219/121.14 |
| 63-115689 | 5/1988 | Japan | 219/121.75 |
| 3-180286 | 8/1991 | Japan . | |
| 593757 | 12/1977 | Switzerland . | |
| 1579682A | 7/1990 | U.S.S.R. . | |
| WO94/08750 | 10/1993 | WIPO . | |

OTHER PUBLICATIONS

Gratzke et al., *Theoretical Approach to the Humping Phenomenon in Welding Processes*; J. Phys. D. Appl. Phys. 25 (1992) pp. 1640–1647.

Jones et al., $CO_2$ *Laser Welding of Aluminum Alloys*, Proceedings of Lamp '92, Nagaoka, Jun. 1992, pp. 523–528.

(List continued on next page.)

*Primary Examiner*—Teresa J. Walberg
*Assistant Examiner*—Gregory L. Mills
*Attorney, Agent, or Firm*—Nilles & Nilles, S.C.

[57] ABSTRACT

A method of welding using a high energy density radiation beam such as an electron beam or preferably a laser beam to weld a pair of sheets using an oblong focused beam spot for reducing the power density of the oblong beam spot to maximize welding speed while minimizing welding defects. The high energy density radiation beam source has a power of at least one kilowatt for achieving Keyhole welding, and a beam delivery system capable of focusing the beam into an oblong spot shape, such as a generally rectangular focused beam spot shape, and directing the beam spot onto at least one of the sheets to weld the sheets. During welding, the beam is focused into an oblong focused beam spot and trained on at least one of the sheets to weld them with the longitudinal axis of the beam spot preferably oriented generally tangent to the weld line, generally parallel to the weld direction, or acutely angled relative to the tangent to the welding direction. Preferably, if a laser is used, it is a laser emitting a continuous wave beam, a pulsed laser operating at a duty cycle of at least 50% such that it substantially performs as a laser emitting a continuous wave beam, or a laser in rippled or modulated mode having a continuous beam component with an average output power of at least 80% of the peak power of the laser so that it substantially performs as a continuous wave laser beam.

42 Claims, 9 Drawing Sheets

OTHER PUBLICATIONS

Aruga et al., *Efficient and High–Quality Overlap Welding of Car–Body Aluminum Alloy Metal Sheets with High Power . . . Fiber Beam Delivery*, Proceedings of Lamp '92, Nagoaka, Jun. 1992, pp. 517–522.

Minamida et al., *Butt Welding of Thin Stainless . . . Nd–YAG Laser*, ICALEO, 1991, pp. 168–177.

Haruta et al., *High Power Pulse YAG Laser Welding of Thin Plate*, Proceedings of LAMP '92, Nagaoka, Jun. 1992, pp. 499–504.

Kimura et al., *Welding Properties with High Power Pulsed $CO_2$ Laser*, LAMP '87, pp. 169–174.

Sharp, *Development and Implementation of High Speed Laser Welding in the Can Making Industry*, Proceedings of LAMP 1987, Osaka, May 1987, pp. 541–547.

Hiramoto et al., *Deep Penetration Welding with High Power $CO_2$ Laser*, Proceedings of Lamp '87, Osaka, May 1987, pp. 157–162.

Tanimoto et al., *Advances in High Power $CO_2$ Laser Optics*, Proceedings of Lamp '92, Nagaoka, Jun. 1992, pp. 185–190.

Haruta et al., *High Power Pulse YAG Laser Welding of Thin Plate*, Proceedings of Lamp '92, Nagaoka, Jun. 1992, pp. 499–504.

Jones et al., *$CO_2$ Laser Welding of Aluminum Alloys*, Proceedings of Lamp '92, Nagaoka, Jun. 1992, pp. 523–528.

Hiramoto et al., *Deep Penetration Welding with High Power $CO_2$ Laser*, Proceedings of Lamp '87, Osaka, May 1987, pp. 157–162.

Ward, *A Better Class of Sandwich*, ENGINEERING, May 1991.

Dawes, *Laser Welding of Sheet Metal Fabrications—Process Improvements*, ICALEO '85, pp. 73–80.

Kymal, *Laser Welding in High Production*, L.I.A., vol. 38, ICALEO 1983, pp. 90–96.

Katayama et al., *Pulse Shape Optimization . . . Stainless Steels*, ICALEO, 1993, pp. 487–497.

Mombo–Caristan et al., *Seam Geometry Monitoring for Tailored Welded Blanks*, ICALEO, 1991, pp. 123–132.

Kim et al., *Laser Welding of Electrical Sheet Steel*, ICALEO '85, pp. 59–63.

Shinmi et al., *Laser Welding and Its Applications for Steel Making Process*, ICALEO '85, pp. 65–72.

Dawes, et al., *$CO_2$ Laser Welding of Deep Drawing Steel Sheet and Microalloyed Steel Plate*, L.I.A. vol. 38 ICALEO 1983, pp. 73–79.

Garrison, *Laser Beam Welding Goes Into High–Speed Production of Home Hot Water Tanks*, Welding Journal, Dec. 1993, pp. 53–57.

Hinrichs et al., *Production Electron Beam Welding of Automotive Frame Components*, Welding Journal, Aug. 1974, pp. 488–493.

Baardsen et al., *High Speed Welding of Sheet Steel with a $CO_2$ Laser*, Welding Journal, Apr. 1973, pp. 227–229.

Metzbower, et al., *Laser Beam Welding*, Special Welding Processes, pp. 647–671.

Llewellyn, *Laser Welding of High–Speed Roll–Formed Products*, Lasers In Manufacturing, 1987, pp. 297–301.

Mombo–Caristan et al., *Process Controls for Laser Blank Welding*, Automotive Laser Applications Workshop '93, Mar. 1993.

Mombo–Caristan et al., *Tailored Welded Blanks: A New Alternative in Automobile Body Design*, The Industrial Laser Handbook, 1992–1993, pp. 90–102.

Engel, *Tooling Up for Laser Welding*, Society of Manufacturing Engineers, Abstract, 1976.

Third International Focal Spot Users Seminar, United Technologies Industrial Lasers, Mar. 1992.

Berkmanns et al., *Mechanical Properties of Laser Welded Aluminium Joints*, ISATA, Jun. 1992, pp. 453–459.

Haferkamp et al., *Laser Beam Welding of HSS–Components for Car–Bodies*, ISATA, Jun. 1992, pp. 173–179.

Ross et al., *Advances in Laser Welding of Automotive Parts*, ISATA, Jun. 1992, pp. 165–171.

Laser Power, *Series CFR Cylindrical Focusing Reflectors for High Power $CO_2$ Lasers*.

Belforte, Levitt, *The Industrial Laser Annual Handbook 1986 Edition*, pp. 16–20; 69–70; 116.

Belforte, Levitt, *The Industrial Laser Annual Handbook 1992–93 Edition*, pp. 39–41; 67–69.

Bagger, et al., *Process Behaviour during High Power $CO_2$ Laser Welding of Zinc Coated Steel*, Proceedings of LAMP, Jun. 1992, pp. 553–557.

FOCUSSED
BEAM SPOT

INCOMING BEAM
CROSS SECTION

METHOD OF HIGH SPEED HIGH POWER WELDING

FIELD OF THE INVENTION Field of the Invention

This invention relates to a method of welding a first sheet to a second sheet using a high energy density radiation beam and more particularly to a method of welding using an oblong focused beam spot for decreasing average power density of the beam spot and increasing exposure time of the beam spot to the region being welded to maximize welding speed while minimizing welding defects.

BACKGROUND OF THE INVENTION

In commercial production laser and electron beam welding applications, the goal is to maximize welding speed and minimize welding defects while attempting to weld a wide variety of steels, steel alloys, aluminum, aluminum alloys and other alloys. In fact, in most instances, welding speed is the most important limiting factor in achieving higher productivity and lowering production costs. For example, when laser welding metal sheets, the suitable welding speeds that can be achieved are typically a direct function of the penetration depth required. Hence, as sheet thickness increases welding speed typically decreases.

A commonly used strategy to increase welding speed is to increase the power density of a focused laser beam having a circular beam spot at the point where the beam is irradiating or impinging against the workpiece. As is discussed in more detail in an article in the *Proceedings of LAMP '92* entitled "CO₂ Laser Welding of Aluminum Alloys", and in a June 1992, *International Symposium on Automotive Technology and Automation Conference Proceedings* (ISATA), article entitled "ADVANCES IN LASER WELDING OF AUTOMOTIVE PARTS" increased power density can be achieved by increasing laser power or decreasing the focused spot size of the laser. Increasing laser power can obviously be achieved by using a higher power laser.

Decreasing the focused spot diameter of the circular spot can be achieved by using lasers having higher beam quality or better mode. For a laser of a given kilowatt power output, the laser having a beam quality, K, as close to unity or one as possible is preferred for providing a focused beam spot having higher power density over another laser having poorer beam quality. In addition to beam quality, K, the focused beam spot size, w, of a laser is also dependent on the laser output wavelength, $\lambda$, the focal length, f, of the beam focusing optic and the diameter, D, of the unfocused beam from the laser source. This relationship is more clearly illustrated by the following equation for determining the focused beam diameter, w:

$$w = \frac{4K\lambda f}{\pi D}$$

To decrease the focused beam spot diameter, w, for increasing the power density of the focused beam at the workpiece, a laser with a smaller wavelength, $\lambda$, can be chosen or focusing optics with a smaller focal length, f, can be chosen. Alternatively, a laser having a higher beam quality, with $K=M^2=1/k$ as close to the value of 1 as possible can also be chosen or a combination of the aforementioned can be selected to optimize power density of the focused beam spot.

However, as power, power density and welding speed are increased, the frequency of welding defects, weld failures and scrap rate increase to a point where welding speed can no longer be economically increased. These welding defects range from pores, pinholes, undercuts, weld sputters and, in some instances, to undesirable increases in hardness in the heat affected zone of the resultant weld. In welding metals, and particularly steel, another welding speed related defect, called humping or slubbing, can occur. Humping is discussed in more detail in an article in the *Journal of Physics, D: Applied Physics* 25 (1992), entitled "Theoretical approach to the humping phenomenon in welding processes". As is demonstrated in another article in the *Proceedings of LAMP '87* entitled "Deep Penetration Welding with High Power CO₂ Laser", as the focused spot diameter of a relatively high power CO₂ laser beam decreases, power density increases, and the speed at which humping defects occur is reduced, thereby limiting welding productivity. Many of these defects are caused because the high power densities used with circular focused beam spots introduce too much energy too quickly into the region being welded.

One study of laser welding is disclosed in an article in the June 1992, *ISATA Proceedings* entitled "MECHANICAL PROPERTIES OF LASER WELDED ALUMINUM JOINTS", discusses attempts to reduce welding defects in certain specific aluminum alloys. This article describes training a CO₂ laser beam having a power source of at least 2.5 kilowatts at an angle of incidence to the weld direction with the beam being tilted, first, in a direction perpendicular to the direction of welding and, second, along the direction of welding. When angled perpendicular to the direction of welding, the longitudinal axis of the beam spot is perpendicular to the welding direction and when the beam is angled along the direction of welding, such as by "trailing" or "leading" the beam, the beam spot has a longitudinal axis parallel to the welding direction. Unfortunately, deviations in the angle of incidence of the beam perpendicular to the weld direction up to 10° to 15° only slightly influence weld porosity while undesirable porosity in welded aluminum alloy increases dramatically as the angle of incidence is increased beyond about 15°. In fact, porosity is minimized for both cases of angling the beam relative to the workpiece and welding direction as the beam angle of incidence approaches zero degrees and when the beam is generally perpendicular to the workpiece.

Angling the beam relative to the workpiece is also disclosed in a June 1992 *ISATA Proceedings* article entitled "LASER BEAM WELDING OF HSS-COMPONENTS FOR CAR BODIES". This reference discloses that in welding high strength steel (HSS), the laser beam axis can be rotated up to 45° in or against the feed direction without a considerable loss in quality. Hence, beyond a 45° beam angle there is a significant loss in weld quality and an undesirable increase in porosity in the weld.

It is also known that particularly for high power, typically more than one kilowatt, and high speed, typically more than 2 meters per minute, welding applications, if the angle of incidence of the axis of the beam relative to the workpiece is too small, welding defects such as porosity, pinholes, weld sputters, humping, and undercutting increase and weld quality decreases making it highly undesirable to angle the beam too close to the workpiece.

Another method of reducing welding defects for welding difficult to weld materials, such as aluminum alloys, is disclosed in the 1992 *ICALEO Prooceedings* in an article entitled "HIGH POWER PULSE YAG LASER WELDING OF THIN PLATE" and a corresponding publication of European Patent Appln. No. 0594210 A1, published Mar. 24, 1994, and entitled "Method and apparatus for welding material by laser beam". These references disclose using a pulsed laser and angling the beam obliquely relative to the workpiece it is irradiating to create what is referred to as an elliptically-shaped focused beam spot on the workpiece for suppressing weld cracks and pores in the weld joint of the difficult-to-weld material.

The pulsed YAG laser used in these references to weld difficult to weld aluminum alloys of thin sheet thickness has a relatively low average power of 800 watts and welds at a relatively low speed of 1.0 millimeters per second. This method is not suited for commercial laser welding applications, such as automotive sheet metal welding, tube welding, or continuous welding of roll-formed parts, which typically require a welding speed of greater than 30 millimeters per second or about 2 meters per minute to be economically viable. Additionally, low power pulse lasers of typically less than one kilowatt average power are not suited for sheet metal welding applications requiring adequate penetration, high speed and high productivity. For welding thicker sheet material, such as automotive deep drawing steel of 1 millimeters cross sectional thickness and thicker, a higher power laser is needed to meet the high industry production rates required to be economically competitive.

Additionally, these references disclose that the laser source be pulsed for initiating melt-solidification, remelt-resolidification cycles to reduce weld defects, namely pores, weld sputters and cracks. Unfortunately, pulsing requires sophisticated and expensive electronic hardware to generate and control the frequency, shape, and duration of the laser pulses. Furthermore, since the lasers disclosed are pulsed for providing a way of reducing and controlling average power density at the workpiece, the average power output of the laser is less than its peak power. Moreover, if pulsing at too high of a frequency is performed, the beam no longer initiates melt-solidification, remelt-resolidification cycles to reduce weld defects, namely pores, weld sputters and cracks.

Welding speeds that can be achieved using pulsed lasers are also limited because if the beam travels too fast along the workpiece it can leave portions of the workpiece along the weld line inadequately welded or unwelded during the periods when the beam is off or between pulses. For example, if f represents the number of pulses per second (pps) in Hertz and, d, represents cumulative or total the dwell time of a laser pulse in seconds, then, t=1/f−d, represents the time duration between pulses during which the workpiece is exposed only to a continuous component of laser power, if there is any continuous component. As a result, when welding at higher speeds with a pulsed laser having no continuous component, the workpiece is not exposed to any beam energy during the time period defined by: t=1/f−d, resulting in a section having length, l=V*t along the weld line of the workpiece that may not be adequately welded or not welded at all. If there is a continuous laser beam component and the continuous component is less than 80% of the peak power, if t is too great, sections along weld line may not be adequately welded or not welded at all. Accordingly, the larger the welding speed, V, the longer this potentially unwelded or poorly welded distance, l, between pulses becomes. If welding at high enough welding speeds, some portions of the weld joint might not be welded adequately, particularly if l>0.1 millimeter. Also, if pulsing is at a frequency such that t becomes too small, the beam no longer initiates melt-solidification, remelt-resolidification cycles to reduce weld defects. This is why duty cycles of pulsed lasers are generally lower than about 50%.

Other references disclosing the use of pulsed lasers for reducing welding defects include *LAMP* '87, "Welding Properties with High Powered Pulsed $CO_2$ Laser"; *LAMP* '87 (May 1987), "Development and Implementation of High Speed Laser Welding in the Can Making Industry"; *LAMP* '92 (June 1992), "High Power Pulse YAG Laser Welding of Thin Plate"; and a 1991 *ICALEO* article entitled "Butt Welding of Thin Stainless Steel Sheets with 'Rippled Mode' Nd-YAG Laser" and U.S. Pat. No. 5,347,528.

Linear or line focusing optics have been coupled with lasers to produce a linear or generally rectangular beam spot used for surface cladding, surface hardening and surface melting workpieces as part of final finishing of these workpieces. It is not believed that heretofore these linear and generally rectangular beam spot shapes have been used to weld workpieces and more particularly to butt-weld or lap weld sheets in a commercial welding setting.

SUMMARY OF THE INVENTION

The present invention is directed to a method of welding using a high energy density radiation beam to weld one sheet to another sheet with an oblong focused beam spot for reducing the power density of the beam spot to maximize welding speed while minimizing welding defects. The source for producing the high energy density radiation beam is an electron beam source or preferably a laser having a power, P, of at least one kilowatt and a beam delivery system capable of focusing the beam into an oblong beam spot shape and training the beam spot onto at least one of the sheets during welding. After welding is completed, the sheets preferably form a blank that can be shaped or formed or otherwise three-dimensionally contoured.

Before welding, the two sheets are oriented and positioned in close proximity to each other to form a weld joint, such as a lap joint, a butt joint, a T-joint, or another type of weld joint. After positioning the sheets for welding, the sheets are preferably fixtured, such as by clamps, to maintain the sheets in close proximity to each other during welding. If desired, the sheets can be positioned to orient the weld interface relative to the direction of gravity so that any weld nugget of molten sheet material formed during welding will be influenced by the direction of gravity.

To weld the sheets, an incoming beam of high energy density radiation is focused into an oblong focused beam spot shape preferably where the beam impinges against at least one of the sheets to irradiate the sheet or sheets with energy from the focused beam. The focused beam is trained on at least one of the sheets and moved along a weld line formed at a weld interface of the sheets that is preferably in the region where the sheets are in close proximity to each other. Preferably, the beam is moved along the weld line at a welding speed of at least one meter per minute and preferably at least two meters per minute.

When focused into an oblong beam spot shape, the beam spot preferably has a length, L, greater than its width, w, such that the focused beam width, w, satisfies:

$$w^2 \leq \frac{P}{15} * \frac{10^6}{P_{dens\ min}}$$

and the length, L, of the oblong focused beam spot is within about the following limits:

$$1.5 w \leq L \leq \frac{P}{w} * \frac{10^5}{P_{dens\ min}}$$

During welding, the longitudinal axis of the oblong focused beam spot is preferably generally tangent to the welding direction. If the longitudinal axis is acutely angled relative to the direction of welding, the longitudinal axis of the focused beam spot is preferably angled within a range of about ±45°, and preferably about ±10°, of the tangent to the weld line or parallel to the weld direction, particularly for compensating for joint fit-up gaps or for increasing weld width. Preferably, this angle is about 0° where beam weaving or beam spinning is not being performed.

Additionally, during welding, the axis of the high energy density radiation beam is preferably generally perpendicular to the surface portion of the sheets being irradiated by the oblong focused beam, although, if desired, the beam can be acutely angled relative to the portion of the surface of the sheets being irradiated by the oblong beam spot. If the beam axis is acutely angled, it preferably is angled within the range of about +150° of perpendicular to the surface portion of the sheets being irradiated by the oblong focused beam spot.

To produce an oblong focused beam spot, the beam delivery system preferably uses at least one reflective optic, such as a cylindrical mirror, parabolic mirror, elliptical mirror or another type of mirror, or at least one lens. Alternatively, a combination of more than one reflective beam optic as well as more than one lense or a beam integrator can be used to produce the oblong focused beam spot.

Preferably, the high energy density radiation source is a laser having a power output of at least one kilowatt to achieve keyhole welding. If the laser is a $CO_2$ laser, it preferably has an output power of at least three kilowatts and if the laser is a YAG laser, it has an output power of at least about one kilowatt. Although a laser emitting a continuous wave laser beam is preferred as the beam source, a pulsed laser source can be used, provided that the pulsing duty cycle is at least 50%. Alternatively, a laser operating in rippled mode with a continuous beam component having an output power of at least about 80% of the peak power of the laser can be used.

When welding is completed, a weld of good integrity, high tensile strength and high fatigue strength joins the sheets together. If the weld is a lap weld, the weld preferably also possesses high peel strength so that the sheets resist peeling apart from each other in the weld region, particularly during forming or shaping the sheets. Preferably, after welding is completed, the sheets form a blank that can be shaped or formed using conventional shaping or forming methods.

Objects, features and advantages of this invention are to provide a method of welding using a high energy density radiation beam for welding sheets using an oblong focused beam spot that produces a weld having good integrity and high strength; results in welded sheets that can be conventionally formed such as by shaping, deep drawing, flanging, hydro-forming, bending, roll forming, die stamping, or any other forming method; is capable of utilizing the direction of gravity to influence formation, geometry and flow of the weld nugget during welding; is capable of utilizing the direction of gravity to advantageously orient the weld keyhole relative to the plane of the weld interface; is easily adaptable to a continuous laser welding apparatus for continuously welding a pair of sheets uncoiled from coil stock; reduces the power density of the beam spot in the region being welded for maximizing welding speed while minimizing welding defects; can advantageously be used to weld sheets of unequal thicknesses with one of the sheets being thicker than the other; can be used to weld two sheets of equal thickness or lap weld or butt weld two sheets; can be used with both autogenous and filler metal welding applications; can be used to lap weld sheets of relatively thin cross sectional thickness; can be used to lap weld sheets spaced slightly apart by metal processing burrs; can be used to join sheets coated with organic or inorganic coatings; is economical because it can be used to weld two sheets together with each of the sheets having different desired mechanical or other desired properties to form a blank that can be later conventionally formed to produce a product having the desired properties in desired area of the finished product; is a method that is simple, flexible, economical and reliable; is versatile; reduces welding defects while achieving higher welding speeds; and which produces a weld that is durable, possesses good integrity, high tensile strength, and high fatigue resistance to cyclical and repetitive loading.

BRIEF DESCRIPTION OF THE DRAWINGS

These and other objects, features and advantages of this invention will become apparent from the following detailed description of the best mode, appended claims, and accompanying drawings in which:

DETAILED DESCRIPTION OF THE INVENTION

Figure 1:
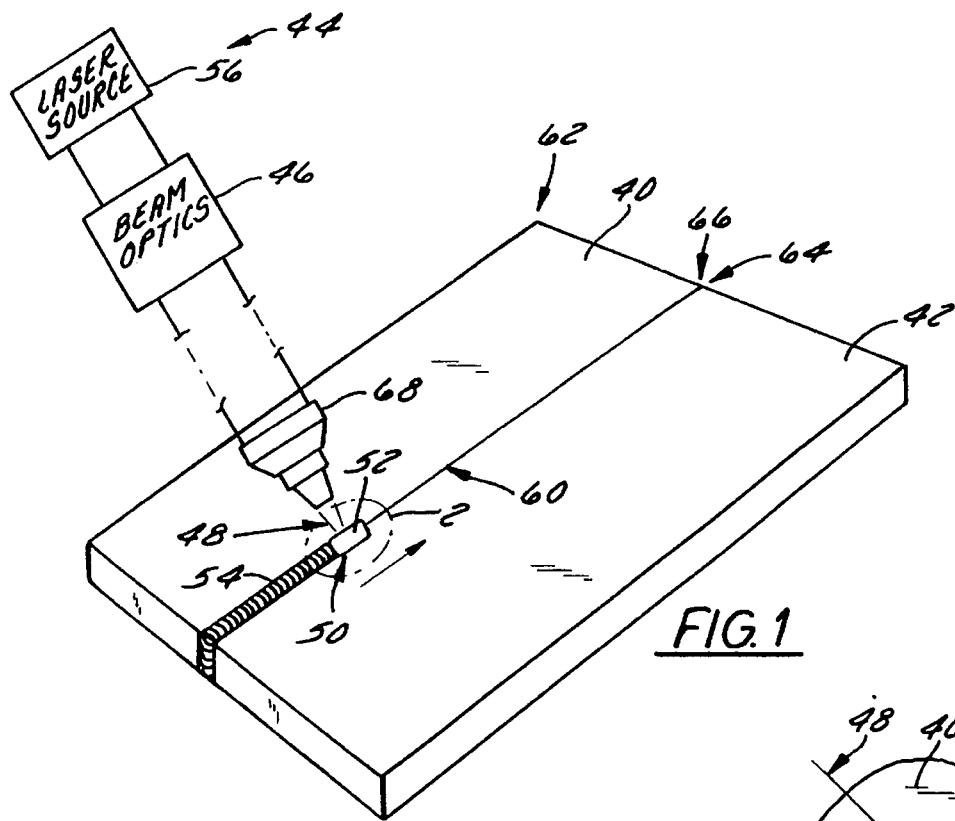
FIG. 1 is a perspective view of a pair of sheets with their edges facing each other to form a butt joint and being welded by a high energy density radiation beam using a method of welding of this invention.
Figure 2:
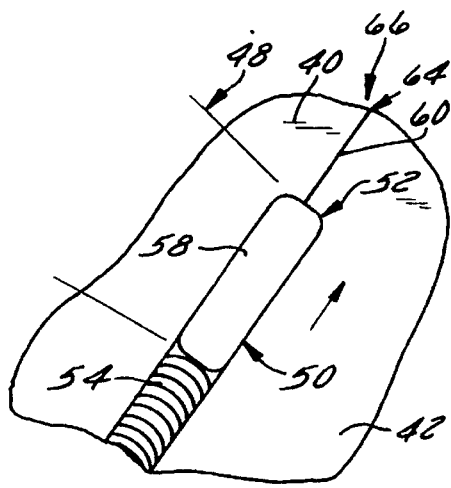
FIG. 2 is an enlarged fragmentary perspective view of the region of the sheets enclosed by the circle 2 in FIG. 1 illustrating more clearly the sheets being butt welded with a high energy density radiation beam having an oblong focused beam spot.

Referring now to the drawings, FIGS. 1 & 2 illustrate welding a first sheet 40 to a second sheet 42 using a method of high energy density radiation beam welding of this invention that uses a high energy density radiation beam source 44 and beam delivery system, such as the beam optics 46 depicted, to produce a high energy density radiation beam 48 with a focused beam spot 50 having an oblong shape 52 for decreasing average power density and increasing exposure time of the region of sheet material being welded to beam energy for maximizing welding speed while joining the sheets 40 & 42 together with a weld 54 that possesses good integrity and high strength.

As is more clearly shown in FIG. 2, the oblong focused beam spot 52 is preferably generally rectangular or linear in shape 58, although other elongated, non-circular beam spot shapes are suitable provided that the length of the focused beam spot 50 is larger than its width. Preferably, a longitudinal axis of the oblong beam spot 52 is oriented generally parallel to the direction of travel of the beam 48 or tangent to a weld line 60 where the sheets 40 & 42 are in close proximity to each other forming a weld joint. Alternatively, the oblong beam spot 52 may be oriented with its longitudinal axis acutely angled relative to the weld direct ion.

preferably, the high energy density radiation beam source 44 is a continuous wave laser 56, such as a $CO_2$ laser, CO laser, excimer laser or other gas laser, a solid state laser, or an electron beam welder capable of focusing a beam of high energy density radiation 48 into a generally oblong shape 52 at the beam spot 50 where the beam impinges against at least one of the sheets 40 or 42 or both of the sheets 40 & 42 during welding. If a $CO_2$ laser is used, it preferably has an average output power of at least about three kilowatts. If a YAG solid state laser is used, it preferably has an average output power of at least one kilowatt. If a pulse type laser is used, it is preferably operated at least at a 50% duty cycle so that it behaves as a continuous wave laser source and if operated in rippled power mode the laser has a continuous power component of preferably at least 80% of the peak beam output power of the laser source.

After welding, the sheets 40 & 42 preferably form a blank 62 that can be formed using conventional forming methods such as bending, deep drawing, roll-forming, hydro-forming, shaping, flanging, trimming, piercing, die stamping, or another shaping or forming process. To enable the sheets 40 & 42 to be joined together using a high energy density radiation beam 48, the sheets 40 & 42 are preferably constructed of weldably similar material and are preferably constructed of a metal such as a steel, aluminum, copper, or another metal capable of being welded by a high energy density radiation beam such as a laser or electron beam. The sheet material can also be coated with an organic or inorganic coating, such as for example, a zinc coating applied to one or both sides of a steel sheet to impart corrosion resistance.

As a result, this method of welding using a high energy density radiation beam 48 focused into an oblong focused beam spot 52 is particularly well suited for welding automotive steel sheeting, including automotive deep drawing steel sheeting, that is preferably galvanized to provide corrosion protection and automotive aluminum sheeting. Alternatively, there can be applications of this invention where non-weldable, dissimilar materials, such as nickel and silver, can be diffusion bonded together, if sufficient pressure is applied simultaneously with the heat input of the laser 56.

Preferably, the sheet material to be welded using the method of this invention has a thickness of at least about 0.5 millimeters. Preferably, the maximum sheet thickness is no greater than about 5 millimeters.

Advantageously, this method of high energy density beam welding enables two or more sheets to be welded together to produce a blank 62 that can be formed after welding with the sheets being selected to impart to the blank 62 and finished product formed from the blank 62 certain desired mechanical properties, at least in the region of that sheet having the desired properties. By imparting to the blank 62 desired mechanical properties only where needed, thinner gauge and/or less expensive sheet material can be used elsewhere where these properties are not needed, making the blank 62 less costly to manufacture while still being suitable and optimized for its intended use after forming is completed.

Preferably, this method of welding is well suited for use in a continuous welding environment and can preferably be implemented for use with a continuous welding apparatus to continuously weld sheets uncoiled from coiled stock. If desired, to facilitate controlling formation, geometry and/or flow of a weld nugget (not shown) of molten sheet material during welding, a weld interface 64 of the sheets 40 & 42, where the sheets are placed in close proximity to or in contact with each other, can be acutely oriented relative to the direction of gravity for enabling the direction of gravity to influence formation, shape and/or flow of the weld nugget. If desired, the sheets 40 & 42 as well as the weld interface 64 can be oriented acutely relative to the direction of gravity to position a keyhole, formed in the molten weld nugget during high energy density radiation beam welding, relative to the weld interface 64 to facilitate welding.

Figure 3:
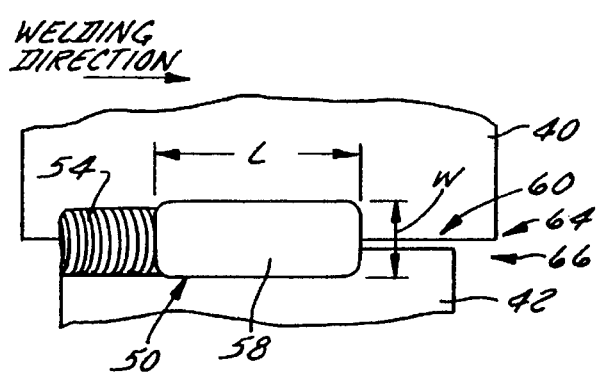
FIG. 3 is an enlarged fragmentary top view of a pair of sheets abutted to form a butt joint and being welded using a high energy density beam of generally rectangular focused spot shape.

As is shown in FIGS. 2 & 3, the first sheet 40 is positioned with one of its sheet edges facing a sheet edge of the second sheet 42 to form a butt joint 66 of conventional construction. Preferably, the sheets 40 & 42 are fixtured, such as by clamps, in abutting relationship to each other to maintain the butt joint 66 during welding. During welding, a laser gun assembly 68 trains the laser beam 48 onto the butt joint region 66 of the sheets 40 & 42 to fuse and weld the first sheet 40 to the second sheet 42. To join the sheets 40 & 42 longitudinally along the weld interface 64 of the butt joint 66, the laser gun 68 moves relative to the sheets 40 & 42 causing the beam 48 to move generally along the weld line 60 and in the direction generally indicated by the arrow shown in FIGS. 1 & 2. If joint fit-up gap is too great, filler metal can be used, although autogenous welding is preferred.

Preferably, for welding sheets arranged in a butt joint 66, or a lap joint (FIG. 13), the weld line 60 is preferably substantially straight. If any portion of the weld line 60 is curved or three-dimensionally contoured, preferably, the length of the curved or contoured portion of the weld line 60 has a radius of curvature of at least about one hundred times the longitudinal length, L, of the oblong focused beam spot 52 when the path of beam travel along the weld interface 64 is a generally straight line path of travel and beam weaving or spinning is not being performed. For a weld line 60 or a portion of the weld line 60 having a radius of curvature that is less than one thousand times the length, L, of the oblong focused beam spot 52, welding speed may have to be reduced to weld that curved portion. If weaving or spinning the beam 48 is performed, the radius of curvature of the weld line 60 along the weld interface 64 can preferably be even less.

Although not shown, during welding, a welding assist gas, such as argon, helium, nitrogen, another assist gas, or a suitable combination of assist gases is preferably directed from an assist gas supply through a nozzle onto an area of the sheets 40 & 42 in the region where the focused laser beam 48 is irradiating the sheets 40 & 42 for significantly reducing and preferably preventing gaseous contamination of the weld 54 and reducing plasma shielding effects. Preferably, assist gas is also applied to the root or back side of the sheets in the region being welded for preventing gaseous contamination and for smoothing the geometry of the weld 54.

As is illustrated more clearly in FIG. 3, the beam 48 is focused and trained onto at least one of the sheets 40 & 42 during welding to heat the sheet material above its melting point or melting points so that the two sheets 40 & 42 will be fused and welded together. For increasing the time the sheets 40 & 42 in the region of the butt joint 66 are exposed to beam energy and thereby enabling welding speed to be maximized, the focused beam spot 50 is oblong shaped 52, is preferably generally rectangular or linear 58 in shape, and is oriented with its longitudinal or major axis generally parallel to the direction of welding or tangent to the weld line 60 during welding.

For an equivalent given laser average power, this elongate, oblong-shaped focused beam spot 52 having its length, L, greater than its width, w, and surface area of about w*L, yields a lower power density as compared to a conventional circular focused beam spot of diameter, w, having a lesser surface area, for more controllably transferring energy into the region of the sheets being welded to melt, fuse and weld the sheet material in a more controlled manner, thereby, minimizing and preferably preventing welding defects, such as pores, pinholes, undercuts, sputters, and humping or slubbing. Since, for a given average laser output power, the circular beam spot transfers energy into the region being welded more rapidly, the welding speed at which these defects will occur is lower than for the oblong focused beam spot 52. This is preferably because, for a laser of given average power, the power density of the oblong focused beam spot 52, having dimensions L and w, is reduced as compared to a circular beam spot of diameter, w, while the exposure time of the region being welded by the oblong beam spot 52 is increased as a result of the oblong focused beam spot 52 having a greater length, L, than the diameter, w, of the circular beam spot and because the longitudinal axis of the oblong focused beam spot 52 is generally oriented parallel to the welding direction or tangent to the weld line.

As such, the oblong focused beam spot 52 enables welding at higher speeds for a laser of a given average power and preferably, also, enables higher power lasers to be used to further increase welding speed while minimizing welding defects to an acceptable commercial level. Since maximum welding speeds achievable are often dependent upon the power of the laser being used to weld the sheet material, as well as the power density of the laser in the region of sheet material being welded, with the method of the present invention, higher power lasers can be used to weld at desired faster welding speeds because the lower power density of the oblong focused beam spot 52 minimizes welding defects at a given welding speed as compared to a circularly focused beam spot. Preferably, if a laser is used, it is a laser emitting a continuous wave beam, a pulsed laser operating at a duty cycle of at least 50% such that it substantially performs as a laser emitting a continuous beam, or a laser operating in a rippled power mode having a continuous beam component with an output power of at least 80% of the peak power of the laser so that it also substantially performs as a continuous wave laser beam.

Oblong Focused Beam Spot

Figure 4:
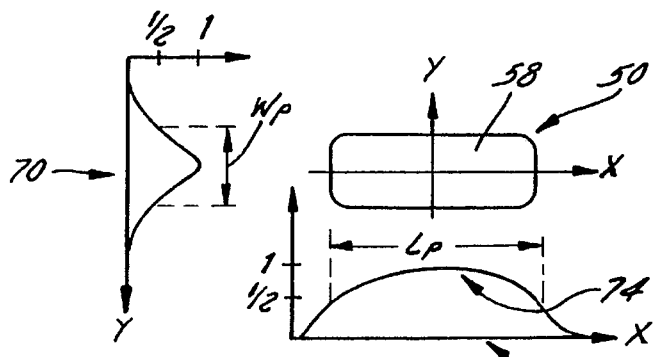
FIG. 4 illustrates the power density distribution characteristics of the generally rectangular focused beam spot shown in FIG. 3.

As is illustrated more clearly in FIGS. 3 & 4, the focused beam spot 50 is oblong 52 and preferably generally rectangular or linear in shape 58, having a length, L, that is greater than its width, w. Although the beam spot 50 is preferably rectangular 58, as is shown in FIGS. 3 & 4, the elongate oblong rectangular spot 58 can have generally rounded, contoured, or smooth corners. As is depicted in FIG. 3, the beam spot 58 is oriented with its longest dimension being generally tangent or parallel to the welding direction, indicated generally by the arrow depicted in FIG. 3, for increasing the amount of time that each portion of sheet material, along the weld line 60 of the weld joint 66 is exposed to beam energy of the focused beam spot 50, thus enabling higher welding speeds to be achieved at lower power densities.

A power distribution along the width, w, and length, L, of the rectangular focused beam spot 58 is shown in FIG. 4. As is depicted in FIG. 4, the power distribution of the beam spot 58 along the Y axis representing the power distribution along the width, w, of the beam spot 58 is represented by a generally gaussian power distribution curve 70, that is generally parabolically shaped. Preferably, the power distribution 70 along a widthwise cross section of the beam spot 58, that is generally perpendicular to the lengthwise or longitudinal dimension of the beam spot 58, has a relatively narrow width, $w_p$, at the ½ peak laser power mark shown on the curve 70. As is further depicted in FIG. 4, the power distribution of the beam spot 50 along the X axis, representing the power distribution along the length, L, of the beam spot 50, is represented by a generally hump-shaped power distribution or power density distribution curve 72, with the curve 72 preferably having a substantially plateau-shaped curve profile 74. Preferably, the power distribution 72 along a lengthwise cross section of the generally rectangular beam spot 58 has a relatively wide length, $L_p$, at the ½ peak laser power mark shown on the curve 72.

To suitably sustain fusion of the sheet material during welding, the average power density of at least some portion of the oblong focused beam spot 52 preferably has a power density that will cause the particular sheet material to melt, fuse and be welded, whether the sheet material is an aluminum or steel sheet material or another metal. To sustain fusion during welding, the focused beam spot power density is at least $10^5$ Watts per square centimeter (Watts/cm$^2$) and preferably has a power density threshold of about $5*10^5$ Watts/cm$^2$ or greater, for welding metals such as steel or aluminum.

The time duration of exposure of beam energy on a particular section of sheet material along a joint being welded can be determined using the following equation:

$$\tau = \frac{L}{V} \quad \text{(Equation I)}$$

where:

$\tau$ is the exposure duration of time that any portion of sheet material along path of travel of the beam 48 along the weld line 60 is exposed to beam energy, $\tau$ is expressed in milliseconds;

L is the length of the focused beam spot 50 in millimeters in the direction of the weld line; and V is the welding speed in meters per second.

Preferably, the power density, $P_{dens}$, of the oblong focused beam spot 52 can be approximated by the following equation:

$$P_{dens} = \frac{P}{wL} * 10^5 \quad \text{(Equation II)}$$

where:

$P_{dens}$ is the power density, in Watts/cm$^2$ of the focused beam spot 52;

P is the average power of the high energy density beam source 44 in kilowatts; and w is the width of the focused beam spot 52 in millimeters.

For example, at a given average laser power of P≧one kilowatt, and for a given beam spot width, w, a maximum allowable beam spot length, L, corresponds to that which produces a minimum power density, $P_{dens\ min}$, necessary to achieve keyhole welding for the material being welded, for example for steel, $P_{dens\ min}$, is about $5*10^5$ Watts/cm$^2$ and a maximum value for welding speed, V, that corresponds to the beam energy necessary to achieve a required penetration depth. Beam penetration depth can depend upon the type of sheet material, sheet thickness, sheet material chemistry or alloy, sheet surface conditions, coatings, laser power, laser wavelength, type of assist gas used, beam focus position, and perhaps other criteria as well. As such, when welding at a power of one kilowatt average laser power or greater and at speeds of two meters per minute or faster, to benefit from the advantages of the present invention, a minimum value for, or, $L_{min}$, for preferably achieving a commercially acceptable weld defect rate such that the resultant weld 54 is of good integrity and high strength and will pass quality control inspection, is preferably about, $L_{min}=1.5\ w$.

The maximum allowable oblong beam spot width, $w_{max}$, can be determined using the following equation:

$$w^2 \leq \frac{P}{15} * \frac{10^6}{P_{dens\ min}} \quad \text{(Equation III)}$$

where:

$w_{max}$ is the maximum allowable width, w, of the focused beam spot 52 in millimeters and P is the power in kilowatts; and $P_{dens\ min}$ is the minimum power density necessary to achieve keyhole welding for the material being welded, in Watts/cm$^2$.

Preferably, the oblong focused beam spot length, L, falls within the following limits:

$$1.5\ w \leq L \leq \frac{P}{w} * \frac{10^5}{P_{dens\ min}} \quad \text{(Equation IV)}$$

where:

w & L are expressed in millimeters;

P is expressed in kilowatts; and $P_{dens\ min}$ is the minimum power density necessary to achieve keyhole welding for the material being welded, in Watts/cm$^2$.

As a further example, the following table provides approximate examples of values for $w_{max}$, and for $L_{max}$ with a typical focused beam width of w=0.3 millimeters, when welding metals with a continuous wave laser, such as a continuous wave CO$_2$ laser and requiring $P_{dens\ min}$ of $5*10^5$ Watts/cm$^2$ (such as for deep penetration keyhole welding of steel or aluminum):

TABLE 1

| Power (kW) | $L_{max}$ (w = 0.3 mm) (mm) | $w_{max}$ (mm) |
|---|---|---|
| 1 | 0.67 | 0.37 |
| 2 | 1.34 | 0.52 |
| 3 | 2.00 | 0.63 |
| 5 | 3.34 | 0.82 |
| 10 | 6.67 | 1.16 |
| 20 | 13.34 | 1.64 |
| 40 | 26.67 | 2.31 |

Therefore, using the welding method of this invention, metal sheets can be welded using a lower power density and still maintain high processing or welding speeds while minimizing the occurrence of weld defects to a commercially acceptable level, if not preferably virtually completely preventing welding defects. Furthermore, welding of coated sheet material is also improved without requiring pulsing of the high energy density beam source 44.

While the high energy density radiation beam welding method of this invention is preferably practiced using a continuous wave (CW) high energy density radiation beam generating source 44, time pulsing of the beam source can be done providing that the beam source has at least a fifty percent duty cycle or is in a rippled power mode with a continuous power component of preferably at least 80% of the peak beam output power and where the distance between the end of one pulse and the beginning of the next pulse is preferably such that the following relationship exists:

$$\frac{V}{f}(1-f*d) \leq \frac{L}{10*w} \text{ millimeter} \quad \text{(Equation V)}$$

where:

V is the welding speed, in mm/sec;

f is the number of pulses per second, in Hertz;

d is the total dwell time of each pulse, in seconds; and f*d represents the duty cycle of the laser being pulsed.

Figure 5:
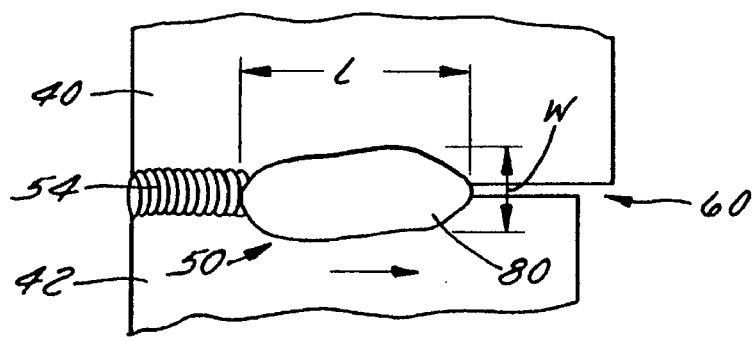
FIG. 5 is an enlarged fragmentary top view of a pair of sheets abutted to form a butt joint and being welded using a high energy density beam of an elongate, generally oblong focused spot shape.
Figure 6:
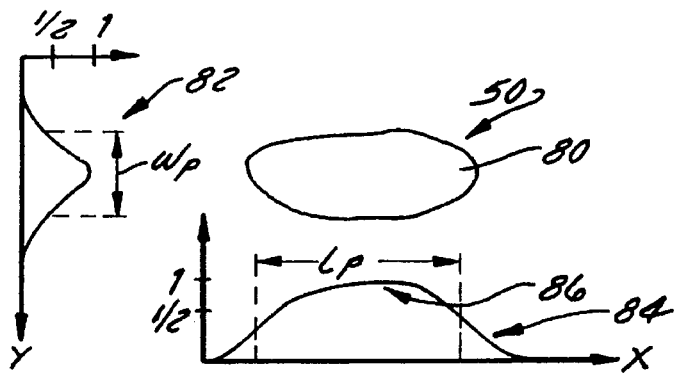
FIG. 6 illustrates the transverse and longitudinal power density distribution of the elongate oblong focused beam spot shown in FIG. 5.

The focused beam spot 50 shown in FIGS. 5 & 6 is elongate and oblong in shape 80, having a length, L, that is greater than its width, w. As is depicted in FIG. 5, the elongate, oblong beam spot 80 is preferably oriented with its longest dimension being generally tangent to the weld line or parallel to the welding direction, indicated generally by the arrow shown in FIG. 5, for increasing the amount of time that each portion of sheet material along the weld line 60 of the weld joint of the sheets 40 & 42 is exposed to beam energy.

The power density distribution along the width, w, and length, L, of the elongated, oblong focused beam spot 80 is shown in FIG. 6. As is depicted in FIG. 6, the power distribution of the elongated oblong beam spot 80 along the width, w, of the beam spot 80 is represented by a generally gaussian power distribution curve 82 which may differ somewhat from the power curve 70 of the rectangular beam spot 58 shown in FIGS. 3 & 4, but preferably is similar in curve profile and shape. Preferably, the power distribution 82 along a widthwise cross section of the elongated oblong beam spot 80 has a relatively narrow width, $w_p$, at the ½ peak laser power mark shown on the curve 82.

As is further depicted in FIG. 6, the power distribution of the beam spot 80 along the length, L, of the spot 80 is represented by a generally hump-shaped power distribution curve 84 with the curve 84 preferably having a substantially plateau-shaped curve profile 86. Although the power distribution curve 84 may differ somewhat from the power curve 72 of the rectangular beam spot 58 shown in FIGS. 3 & 4, it preferably is similar in curve profile and shape. Preferably, the power distribution 84 along a lengthwise cross section of the beam spot 80 has a relatively wide length, $L_p$, at the ½ peak laser power mark shown on the curve 84, as is illustrated in FIG. 6.

Oblong Beam Shapes

Figure 7:
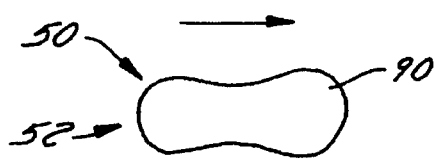
FIG. 7 illustrates an oblong irregularly shaped focused beam spot.
Figure 8:
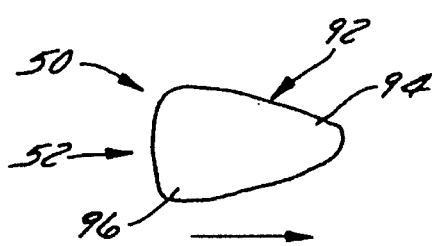
FIG. 8 illustrates an oblong teardrop-shaped focused beam spot having its narrowest portion oriented toward the direction of welding.
Figure 9:
FIG. 9 illustrates an oblong teardrop-shaped focused beam spot with its widest portion oriented toward the direction of welding.

FIGS. 7, 8, & 9, illustrate examples of acceptable non-circular, oblong focused beam spot shapes 52 of this invention. The beam spot shape where the focused beam impinges against sheet material is non-circular, and is preferably rectangular, trapezoidal, oblong or any other type of elongated shape having its length larger than its width and its longitudinal or major axis tangent or generally parallel to the weld joint. The shape of the power distribution curve in a longitudinal direction or along a major axis of the focused beam spot 50 preferably has a large width at ½ peak power, such as is depicted by the curves 72 & 84 shown in FIGS. 4 & 6. The power distribution curve along the direction of the minor axis of the focused beam spot 50 preferably has a narrow width at ½ peak power, such as is also depicted by the power distribution curves 70 & 82 shown in FIGS. 4 & 6. Preferably, any non-circular, elongate focused beam spot used to practice the method of this invention can be approximated as a substantially rectangular beam spot with the length, L, and width, w, dimensions of the focused beam spot satisfying both equations III and IV previously discussed.

As is shown in FIG. 7, the beam spot 50 can be oblong 52 and possess an irregular shape 90. Alternatively, the focused beam spot shape 50 can be a generally teardrop-shaped beam spot 92 such as is shown in FIGS. 8 & 9. FIG. 8 illustrates the teardrop-shaped beam spot 92 oriented with its narrowest end 94 leading as it travels along the weld joint in the direction indicated by the arrow depicted in FIG. 8. FIG. 9 illustrates the teardrop-shaped beam spot 92 oriented with its widest end 96 leading in the direction of beam travel along the weld joint.

The teardrop-shaped focused beam spot 92 is preferably created using at least one of the following: reflective optics, transmissive optics, fiber optics and/or a wave guide apparatus. If the incoming beam has an oblong cross section, the teardrop shape 92 can also be created by angling an incoming oblong focused high energy density radiation beam acutely to the sheets 40 & 42, such as by "trailing" or "leading" the beam 48, as long as the angle of incidence of the beam 48 preferably remains within about ±15° of a direction perpendicular to the sheet in the weld region of the sheets 40 & 42 or perpendicular to the weld direction. Preferably, this allows the beam 48 to be not only perpendicular to the weld direction but angled from the perpendicular to the weld direction anywhere within a range extending anywhere within ±15° of the perpendicular.

Figure 10:
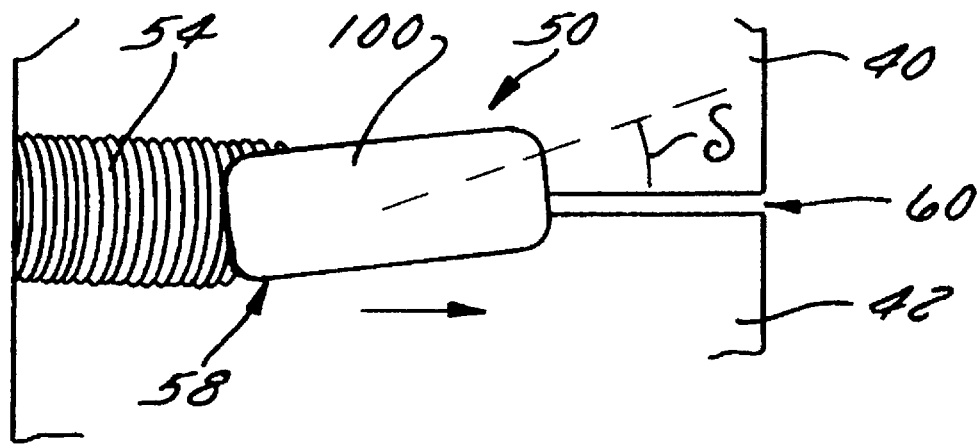
FIG. 10 illustrates a generally rectangular focused beam spot with its longitudinal axis acutely angled relative to the welding direction.

Although the focused beam spot 50 is preferably oriented such that its longitudinal or major axis is preferably tangent or generally parallel to the weld line 60, it can be oriented with its longitudinal or major axis acutely angularly offset to the weld line 60, such as by an angle, δ, as is shown by an angled generally rectangular beam spot 100 shown in FIG. 10. If the beam spot 50 is angled relative to the weld line 60, the angle of orientation, δ, is preferably smaller than or equal to ±45°, and preferably within about ±10°, relative to the weld line 60, such as for slightly widening the width of the finished weld 54, accommodating larger joint fit-up gaps between the sheets 40 & 42, or for controlling how beam energy is introduced during welding into a region being welded.

Figure 11:
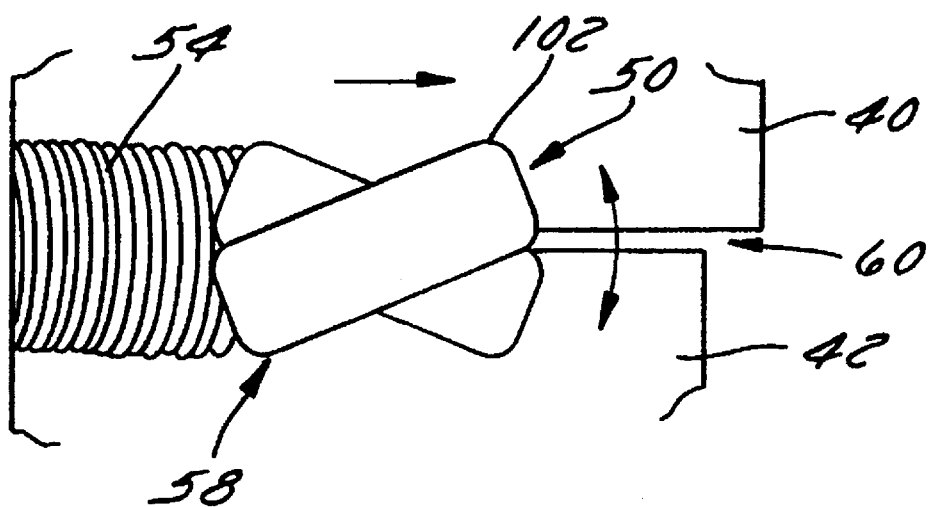
FIG. 11 illustrates the focused beam spot angularly oscillating as it travels along the weld line.

Alternatively, the oblong beam spot 52 can also be oscillated back and forth about an axis of the beam spot 52, as is depicted by the generally rectangular beam spot 58 shown in FIG. 11 being oscillated back and forth 102, such as for accommodating larger joint fit-up gaps between the sheets 40 & 42 or for initiating melting-solidification, remelting-resolidification cycles to release gases from the weld region to prevent these gases from being trapped in the finished weld 54. For example, reflective beam optics whose position can be precisely controlled and accurately moved during welding are used to oscillate the focused beam spot 52 on the sheet material of the sheets 40 & 42 in the manner shown in FIG. 11. Also, fiber optics can be used along with a mechanism to move or oscillate the fiber.

Beam Path of Travel

FIGS. 12A through 12E illustrate preferred paths that the beam 48 and oblong focused beam spot 52 can travel along the sheets 40 & 42 during welding to weld the sheets 40 & 42 along the weld line 60. Beam optics, such as a combination of mirrors and/or lenses, can be used to vary the path of travel of the beam 48 during welding. The path of travel of the laser gun assembly 68 can also be varied to vary the beam path of travel.

Figure 12A:
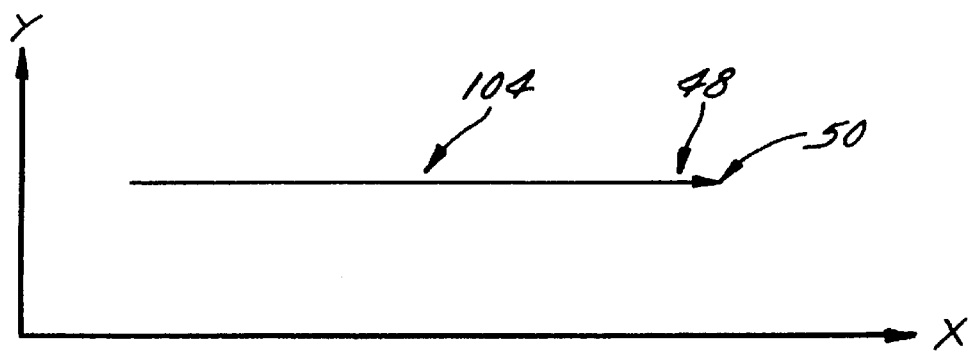
FIG. 12A is a trace depicting a beam having an oblong focused spot shape following a straight line path of travel along a weld line at the weld interface of the overlapped sheets.
Figure 12B:
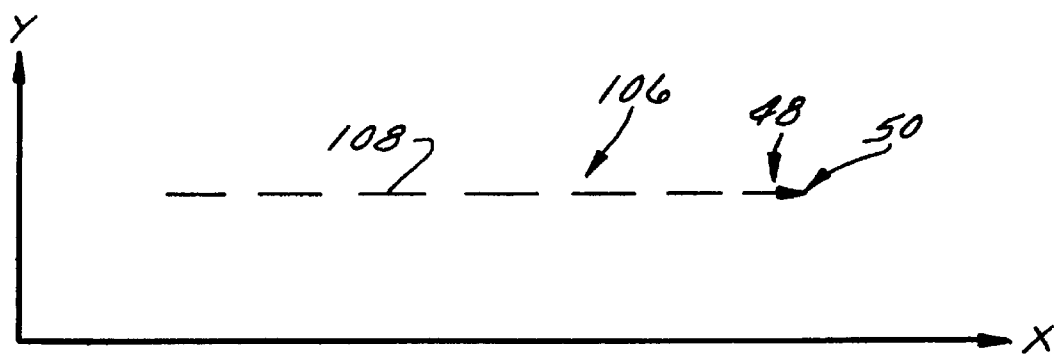
FIG. 12B is a trace depicting the oblong focused spot shape following a discontinuous straight line path of travel for stitch welding.

The beam path of travel shown in FIG. 12A is linear 104 such that the beam 48 and spot 50 moves along the sheets 40 & 42 in a straight line generally in the +Y direction. FIG. 12B illustrates a discontinuous path of beam travel 106 in the +Y direction such that the resultant weld produced is discontinuous longitudinally along the weld line 60 for preferably producing a "stitch" weld joining the sheets 40 & 42 together.

Figure 12C:
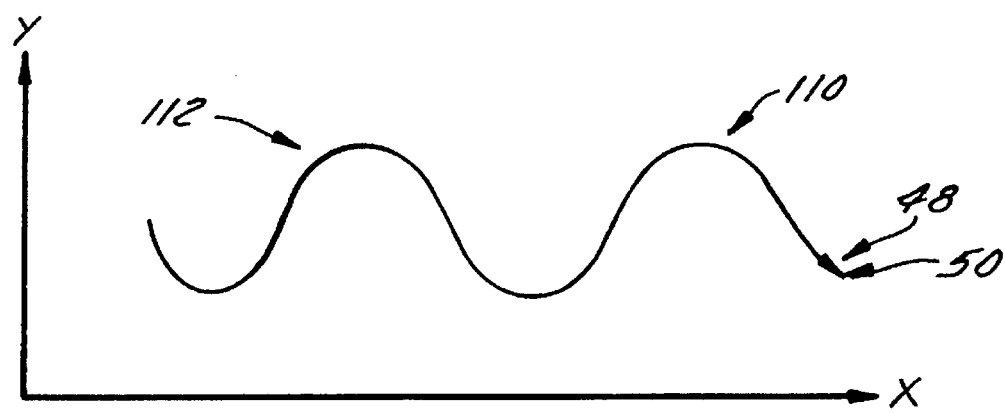
FIG. 12C is a trace depicting weaving the focused beam spot as it travels along the weld line.

FIG. 12C illustrates an oscillating beam path of travel 110 where the beam 48 oscillates relative to the X–Y axes as it travels in the ±Y directions as the beam 48 is also traveling longitudinally in the +X direction; e.g. generally along the weld interface 64 of the sheets 40 & 42, such as for controlling or varying energy input into the sheets 40 & 42 during welding. As is shown in FIG. 12C, the beam 48 and focused beam spot 50 travels alternately upwardly and downwardly along the sheets 40 & 42, such as is depicted by the generally sinusoidal path 112 shown in FIG. 12C.

Figure 12D:
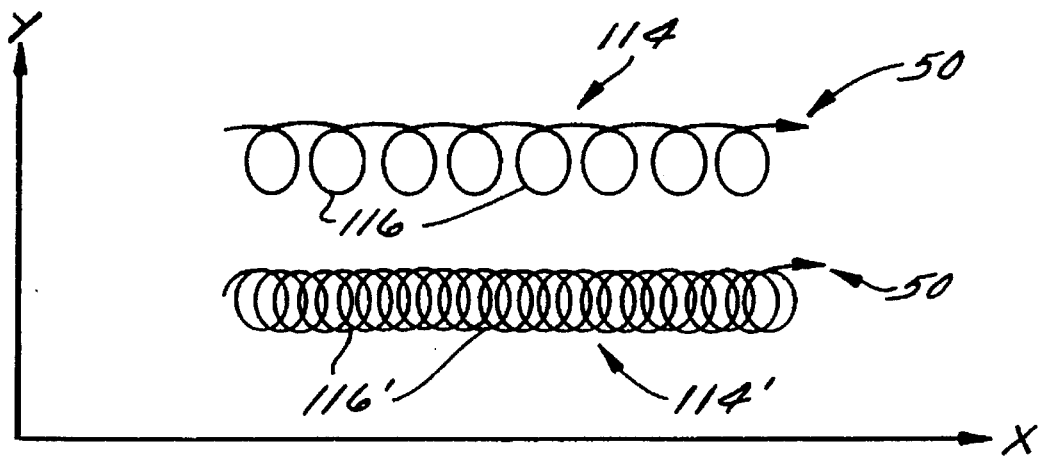
FIG. 12D are traces depicting generally circular spinning of the focused beam spot as it travels along the weld line generally in the X-direction of FIG. 12D.
Figure 12E:
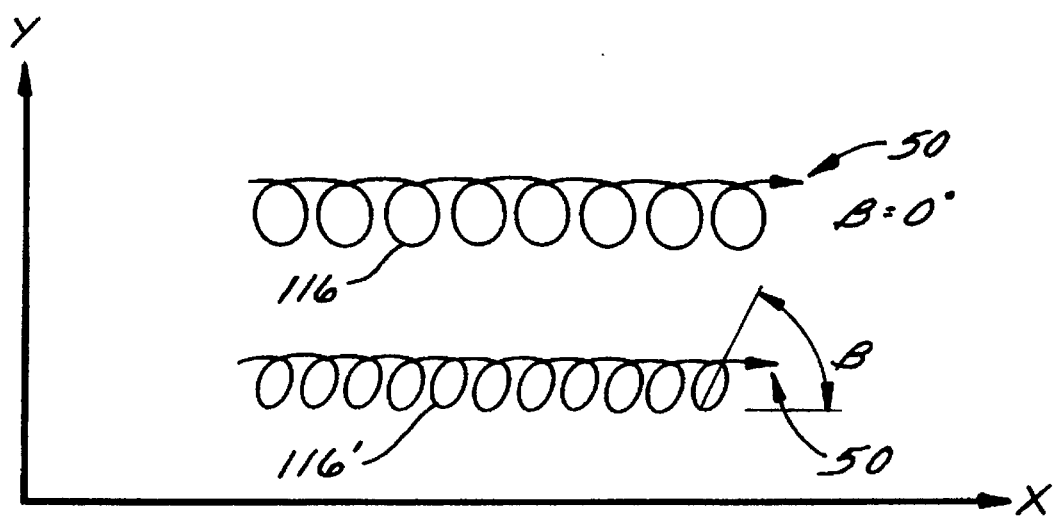
FIG. 12E are traces depicting oblong spinning of the focused beam spot.

FIGS. 12D & 12E depicts spinning the beam 48 and, hence, the oblong focused beam spot 52, as it moves longitudinally along the weld interface 64 of the sheets 40 & 42. Spinning the beam 48 and focused beam spot 50 as the spot 50 travels along the sheets 40 & 42 is preferably done so the beam path of travel 112 or 118 causes the beam spot to overlap where it has previously traveled, at least in some regions of the sheets 40 & 42, causing melting, solidification, re-melting/re-solidification cycles to occur where the beam path of travel has overlapped for releasing gases trapped in the weld fusion zone of the weld, minimizing and preferably preventing related welding defects as well as controlling or enlarging weld width.

FIG. 12D illustrates spinning the beam 48 so that it traces a series of circles 114 or 114' along the sheets 40 & 42 during welding. The upper beam spinning path of travel 114 shown in FIG. 12D has each circle 116 spaced apart from the next circle 116 such that there is only a minimal amount of overlap of the circles 116. The lower spinning beam path of travel 114' depicted in FIG. 12D has the center of each circle 116' spaced slightly apart from the center of the next circle 116 for increasing overlap of the beam path of travel preferably for initiating more melting, solidification, re-melting/re-solidification cycles during welding. Preferably, the distance between circles of the beam path of travel can be adjusted or varied to control the amount of overlap of beam travel for suitably increasing or decreasing melting, solidification, re-melting/re-solidification cycling during welding, as well as for controlling weld width.

FIG. 12E depicts spinning the beam 48 so that it traces a series of oblong shapes or ovals 118 or 118' along the sheets 40 & 42. As is shown by the bottom oblong spinning path of beam travel 118, the axis of each oval traced during beam spinning can be angled relative to the weld line 60 or weld interface 64, such as by an angle, β, shown in FIG. 12E, to achieve the oblong beam spinning path of travel 118' shown in FIG. 12E.

Beam Optics Delivery Systems

Figure 13:
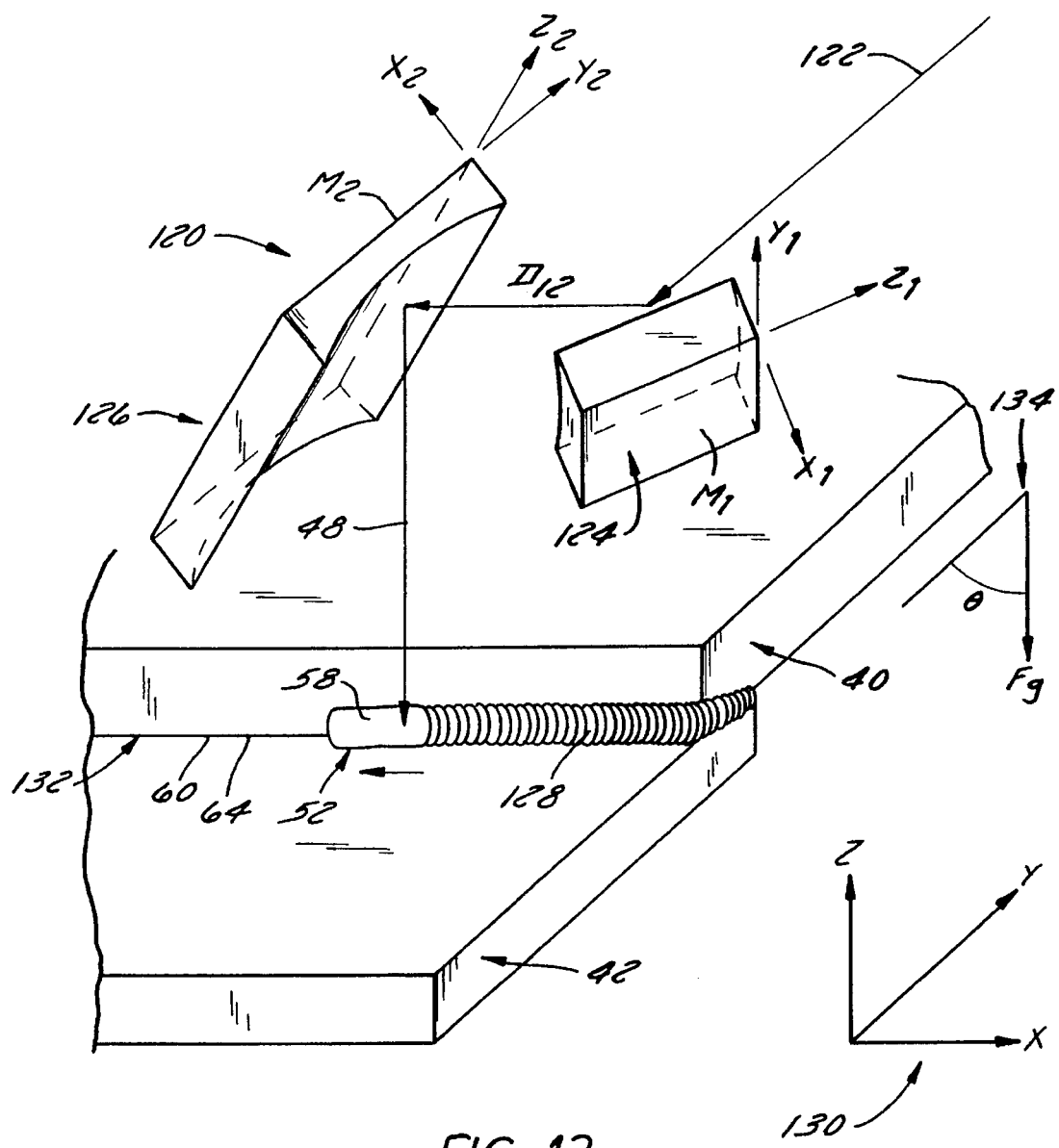
FIG. 13 is a perspective view of a pair of overlapped sheets being welded using the welding method of this invention and using a first combination of reflective optics to shape and focus the beam spot into an oblong focused spot shape.

FIG. 13 illustrates more clearly an example of a beam optics delivery system 120 for producing an oblong focused beam spot 52, such as the generally linear or substantially rectangular beam spot 58 depicted. As is shown in FIG. 13, an incoming laser beam 122 from a laser generating source (not shown) is reflected by a first reflective focusing optic, a cylindrical mirror 124, to a second reflective focusing optic, such as another cylindrical mirror 126, which in turn reflects the focused beam 48 onto the overlapped sheets 40 & 42, producing a generally rectangular focused beam spot 58 on the sheets 40 & 42 to join the sheets 40 & 42 by a lap weld 128 longitudinally along the weld interface 64 of the lap joint 132. Preferably, the incoming beam 122 can have any cross sectional shape, such as a circular, square, elliptical, oblong, or another suitable beam shape. Although a lap joint 132 is shown in FIG. 13, this beam optics delivery system 120 can also be used to weld the sheets 40 & 42 if they are arranged in a butt joint or T-joint arrangement.

While the second mirror 126 is preferably a cylindrical mirror, the second mirror 126 could also be a properly oriented and angled parabolic mirror, elliptical mirror, or spherical mirror and still produce the generally linear or substantially rectangular focused beam spot 58. Although a lap joint 132 is shown in FIG. 13, this beam optics delivery system 120 can be used to weld the sheets 40 & 42 if they are arranged in a butt joint arrangement, or a T-joint, or any other joint configuration, as long as the weld line 60 is substantially straight or has a radius of curvature preferably larger than about one hundred times the length, L, of the focused beam spot.

As is also shown in FIG. 13, the mirrors 124 & 126 are oriented relative to each other and a set of reference coordinate axes 130 for focusing the incoming beam 122 into the desired elongate oblong focused beam spot 52. To produce an oblong focused beam spot 52, such as preferably the generally rectangular beam spot 58 shown in FIG. 13, the Y1 axis of the first cylindrical mirror 124 is preferably oriented at a 0° angle to the Z axis of the reference coordinate axes 130. Additionally, the $Z_1$ axis of the first cylindrical mirror 124 is preferably oriented at a 45° angle to the Y axis of the reference coordinate axes 130.

The second cylindrical mirror 126 of the beam optics delivery system 120 preferably has its Y2 axis at a 0° angle to the Y axis of the reference coordinate axes 130 and its $Z_2$ axis at a 45° angle to the Z axis of the reference coordinate axis 130. If desired, the $Z_2$ axis of the second cylindrical focusing reflector 126 can be oriented within about ±7.5° of the desired 45° angle to the Z axis of the reference coordinate axis 130 and still produce an oblong focused beam spot 52. However, either one of the mirrors 124 & 126 can be replaced by a parabolic mirror.

Minor adjustments to both the orientation of one mirror relative to the other mirror as well as relative to the sheets 40 & 42 may be needed to focus the beam spot to the desired oblong shape 52 or to desirably vary the size and shape of the oblong beam spot 52. Additionally, minor angular adjustments of each mirror 124 & 126 relative to each other, the sheets 40 & 42 and/or the reference coordinate axes 130 may also be needed to adjust the focused beam spot size and shape.

Before welding, the sheets 40 & 42 shown in FIG. 13 are overlapped with each other creating a lap joint 132. To produce a weld of good integrity, high tensile strength and preferably high peel strength, the focused beam 48 is preferably acutely angled relative to the plane of the weld interface 64 created where the sheets 40 & 42 overlap each other. Additionally, the sheets 40 & 42 can both have the same thickness, or different thicknesses from each other, if desired.

If desired, the plane of the weld interface 64 can be acutely angled relative to the direction of gravity, $F_g$, such as is depicted by the angular indicator 134 shown in FIG. 13, for enabling the direction of gravity, $F_g$, to influence the weld nugget of molten sheet material formed where the beam 48 is irradiating during welding. For example, the sheets 40 & 42 can be oriented and fixtured as is shown in FIG. 13 such that the plane of the weld interface 64 is acutely angled at an angle, θ, relative to the direction of gravity, $F_g$.

EXAMPLE

By way of example, the reflective beam optics 124 & 126 are both cylindrical mirrors angled and oriented for producing an oblong focused beam spot 52, that is preferably a rectangularly shaped focused beam spot 58, using an unfocused beam 122 from a six kilowatt $CO_2$ laser source operating at a wavelength, λ, of 10.6 μm. Preferably, the unfocused incoming beam 122 has a diameter, D, of approximately fifty millimeters and is of multimode beam quality having a K factor greater than 1.

The distance between the mirrors 124 & 126 can be represented by:

$$D_{12} = f_1 - f_2 \quad \text{(Equation VII)}$$

where $D_{12}$ is the distance between mirrors 124 & 126, in millimeters assuming just focus conditions for both mirrors 124 & 126;

$f_1$ is the focal length of the first mirror 124, in millimeters; and $f_2$ is the focal length of the second mirror 126, in millimeters.

However, $D_{12}$ may be varied to provide the desired focused beam spot length, L. This can mean that the distance between the mirrors 124 & 126, $D_{12}$, can be adjusted or set such that the first mirror 124 is not at just focus relative to the sheets 40 & 42.

The length, L, of the focused beam spot 52 at just focus is equal to:

$$L = \frac{4K\lambda f_1}{\pi D} \quad \text{(Equation VIII)}$$

where:

L is the length of the oblong focused beam spot 52 in millimeters;

K is the beam quality factor;

λ is the output wavelength of the laser source in mm;

$f_1$ is the focal length of the first mirror 124, in millimeters; and

D is the diameter of the incoming unfocused laser beam 122 in millimeters.

The width, w, of the focused beam spot 52 at just focus is equal to:

$$w = \frac{4K\lambda f_2}{\pi D} \quad \text{(Equation IX)}$$

where:

w is the width of the oblong focused beam spot 52 in millimeters;

K is the beam quality factor;

λ is the output wavelength of the laser source in mm;

$f_2$ is the focal length of the second mirror 126, in millimeters; and

D is the diameter of the incoming unfocused laser beam 122 in millimeters.

If, for example, K=5, and $f_1$=300 mm and $f_2$=150 mm, then using these equations, the focused beam spot width, w, will be about 0.2 mm and the focused beam spot length, L, will be about 0.4 mm, assuming just focus conditions for both mirrors 124 & 126. Using equation II, the power density, $P_{dens}$, of the focused beam spot will be approximately $7.5*10^6$ Watts/cm$^2$ at the sheet material or workpiece. If $f_1$ is set at 400 mm and $f_2$ is set at 200 mm, then w=0.27 mm and L=0.54 mm, yielding a power density, $P_{dens}$, of about $4.1*10^6$ Watts/cm$^2$ at the sheet material or workpiece. Alternatively, if $f_1$ is set at 450 mm and $f_2$ is set at 150 mm, then w=0.2 mm and L=0.6 mm, yielding a power density, $P_{dens}$, of about $5*10^6$ Watts/cm$^2$ at the sheet material or workpiece.

To set or adjust the length, L, of the oblong focused beam spot 52 to a desired length, it may be necessary to deviate from just focus conditions. For example, to set L at approximately 1.5 millimeters, the first mirror can have a focal length, $f_1$, of 400 millimeters and be out of just focus and the second mirror be in just focus and having a focal length, $f_2$, of 200 millimeters, yielding a beam spot focused width, w, of about 0.27 mm and a power density, $P_{dens}$, of about $1.5*10^6$ Watts/cm$^2$ at the sheet material or workpiece as compared with a power density of $10.5* 10^6$ Watts/cm$^2$ for a circular focused beam spot of diameter w=0.27 mm. This results in a welding speed using the oblong focused beam spot that is about seven times greater than the welding speed for a circular focused beam spot having the same power density as the oblong focused beam spot.

Second Beam Optics Delivery System

Figure 14:
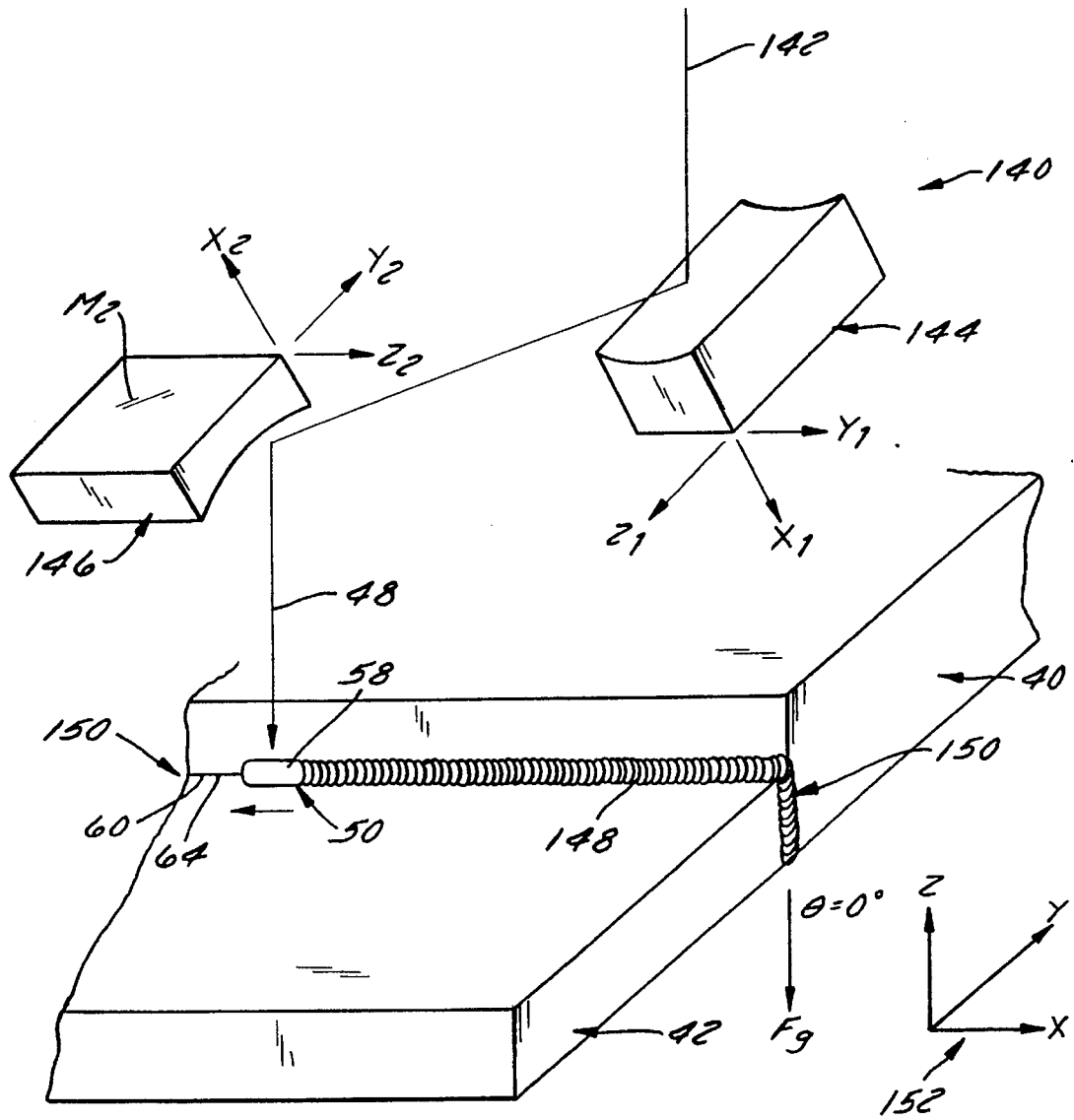
FIG. 14 is a perspective view of a pair of sheets being welded using the welding method of this invention and using a second combination of reflective optics to shape and focus the beam spot into an oblong focused spot shape.

FIG. 14 illustrates a second example of a beam optics delivery system 140 for producing an oblong focused beam spot 52, such as the generally rectangular beam spot 58 depicted. As is illustrated in FIG. 14, an incoming laser beam 142 from a laser source (not shown) is reflected by a first cylindrical mirror 144, oriented as is shown, to a second cylindrical mirror 146, oriented as shown, focusing the beam 142 and directing the focused beam 48 onto the abutted sheets 40 & 42 and producing a generally rectangular focused beam spot 58 on the sheets 40 & 42 to join the sheets 40 & 42 by a butt weld 148 along the weld interface 64 of the butt joint 150. While the second mirror 146 is preferably a cylindrical mirror, the second mirror 146 can also be a parabolic mirror, elliptical mirror, or spherical mirror and still produce the oblong focused beam spot 52. Although a butt joint 150 is shown in FIG. 14, this beam optics delivery system 140 can also be used to weld the sheets 40 & 42 if they are arranged in a lap joint or T-joint arrangement.

The reflective optics 144 & 146 are oriented relative to each other as is shown in FIG. 14 and also relative to a set of reference coordinate axes 152 for focusing the incoming beam 142 into the oblong focused beam spot 52. To produce an oblong focused beam spot 52, such as preferably the generally rectangular beam spot 58 shown in FIG. 14, the $Y_1$ axis of the first cylindrical mirror 144 is preferably oriented at a 0° angle to the X axis of the reference coordinate axes 152. Additionally, the $Z_1$ axis of the first cylindrical mirror 144 is preferably oriented at a −45° angle to the Z axis of the reference coordinate axes 152.

The second cylindrical mirror 146 preferably has its $Y_2$ axis at a 45° angle relative to the Z axis of the reference coordinate axes 152 and its $Z_2$ axis at a 0° angle to the X axis of the reference coordinate axis 152. If desired, the $Z_2$ axis of the second cylindrical mirror 146 can be oriented within about ±7.5° of the desired 0° angle to the X axis of the reference coordinate axis 152 and still produce an oblong focused beam spot 52. However, either one of the mirrors 144 & 146 can be replaced by a parabolic mirror.

Before welding, the sheets 40 & 42 are positioned and fixtured, such as by clamps, with their sheet edges facing each other creating a butt joint 150. As is shown in FIG. 14, the sheets 40 & 42 can have different thicknesses or, alternatively, can both be of the same thickness.

If desired, the plane of the weld interface 64 can be acutely angled relative to the direction of gravity, $F_g$, such as is depicted by the angular indicator 154 shown in FIG. 14, for enabling the direction of gravity, $F_g$, to influence the weld nugget of molten sheet material during welding, such as by influencing the formation, flow and/or geometry of the weld nugget. For example, the sheets 40 & 42 can be oriented and fixtured as is shown in FIG. 14 such that the plane of the weld interface 64 is acutely angled at an angle of about θ=0° such that the plane of the weld interface 64 is generally vertical.

Third Beam Optics Delivery System

Figure 15:
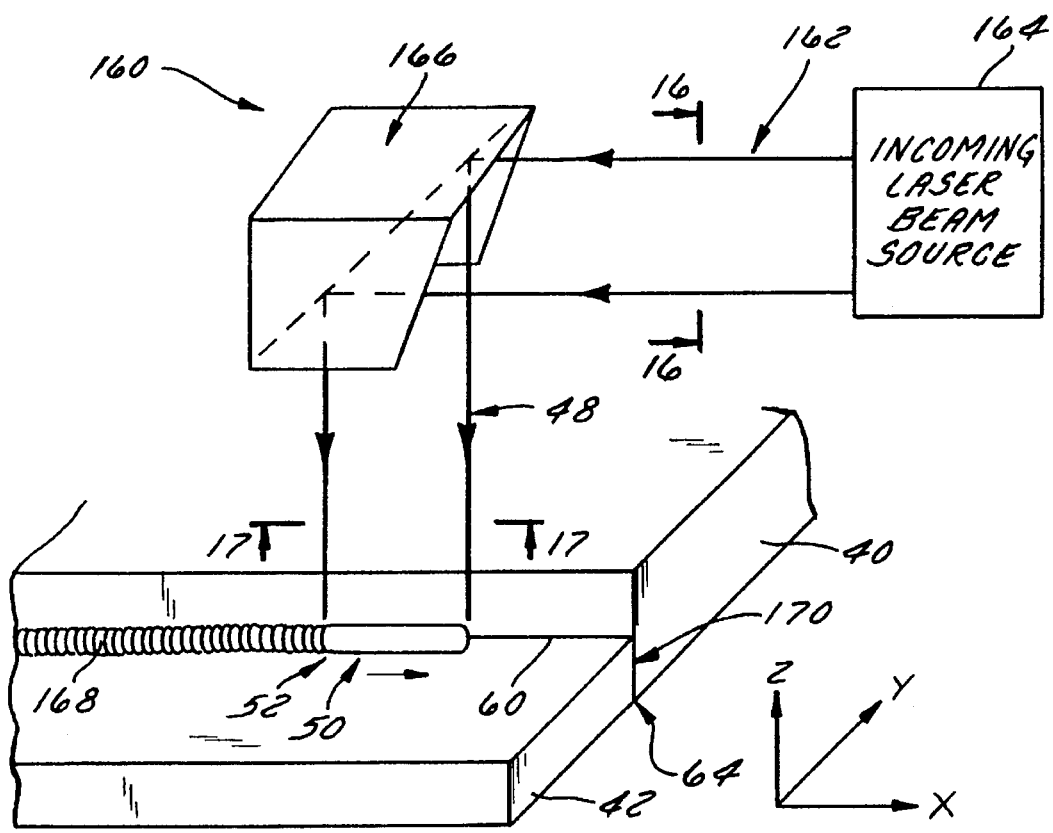
FIG. 15 is a perspective view of a pair of sheets being welded using the welding method of this invention and using a reflective optic to shape and focus the beam spot into an oblong focused spot shape.

FIG. 15 illustrates a third beam optics delivery system 160 for producing an oblong focused beam spot 52. As is illustrated in FIG. 15, an incoming unfocused beam 162 from a laser source 164 is reflected by a single parabolic mirror 166, oriented generally as is shown in FIG. 15, that focuses the beam 162 into an oblong focused beam spot 52 and directs the focused beam 48 onto the abutted sheets 40 & 42 to join the sheets 40 & 42 by a butt weld 168 along the weld interface 64 of the butt joint 170. Although a butt joint 170 is shown in FIG. 15, this beam optics delivery system 160 can also be used to weld the sheets 40 & 42 if they are arranged to form a lap joint, T-joint or another conventional weld joint.

Figure 17:
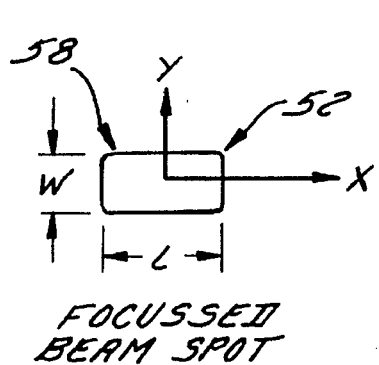
FIG. 17 is an enlarged cross sectional view of the focused high energy density beam taken along line 17—17 of FIG. 15.
Figure 16:
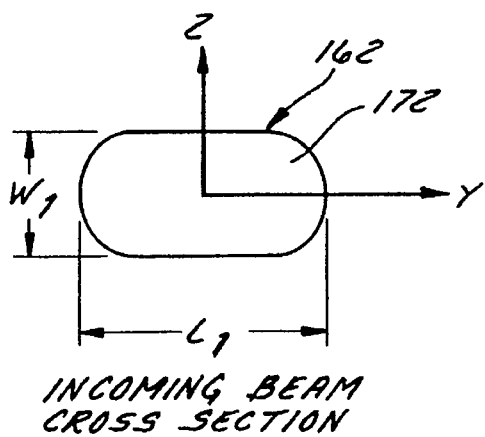
FIG. 16 is an enlarged cross sectional view of the unfocused incoming high energy density beam taken along line 16—16 of FIG. 15.

As is shown more clearly in FIG. 16, the cross section of the incoming beam 162 is preferably oblong in shape 172 and is focused into an oblong, preferably rectangular, beam spot shape 58, as is illustrated in FIG. 17. Preferably, the ratio of the widths and lengths of the cross section 172 of the incoming beam 162 and the focused beam spot 52 follow the relationship:

$$\frac{L}{w} = \frac{L_1}{w_1}$$

where:

L is the length of the oblong focused beam spot 52;

w is the width of the oblong focused beam spot 52;

$L_1$ is the length of the cross section 172 of the incoming beam 162; and $W_1$ is the width of the cross section 172 of the incoming beam 162.

If an incoming beam having a circular unfocused beam cross section is used, the parabolic mirror 166 can also be replaced with a commercially available beam integrator capable of producing an oblong focused beam spot from a circular unfocused incoming laser beam.

Fourth Beam Delivery System

Figure 18:
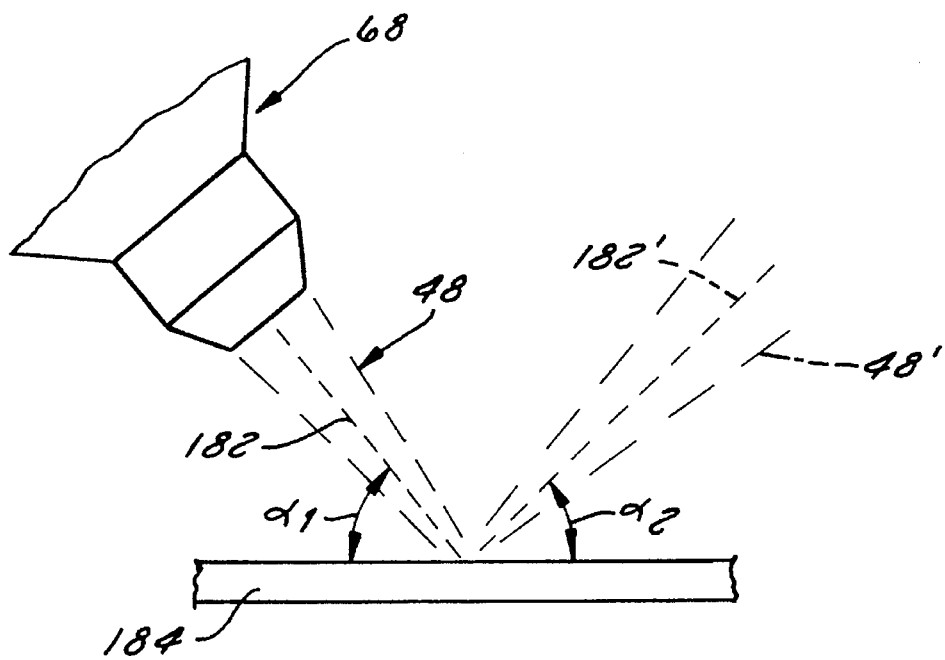
FIG. 18 is a side view illustrating acutely angling the beam relative to the workpiece being welded for creating a teardrop-shaped focused beam spot.
Figure 19:
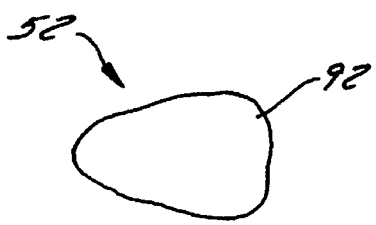
FIG. 19 is a top view of the teardrop-shaped focused beam spot taken along line 19—19 of FIG. 18.
Figure 20:
FIG. 20 is a top view of the irregularly shaped oblong focused beam spot.

FIG. 18 illustrates a fourth beam delivery system for producing an oblong focused beam spot 52 from an incoming beam 48 or 48' of oblong cross sectional shape. As is illustrated in FIG. 18, an axis 182 of the beam 48, shown in phantom, is acutely angled relative to the workpiece 184, such as at an angle, $α_1$, to the workpiece 184 for producing an oblong focused beam spot shape 52. The focused beam spot 52 can be leading the beam 48 or trail the beam 48' such as is shown in phantom in FIG. 18. Preferably, $α_1$ or $α_2$ is at least 75° relative to the sheet surface as is shown in FIG. 18. If the focal length of the optic or optics used to focus the beam are not at just focus, the beam spot produced is preferably teardrop-shaped 92, such as is shown in FIG. 19. However, if the beam is at just focus, the beam spot produced is preferably a symmetrically shaped beam spot 90, such as is shown in FIG. 20.

Other beam optics delivery systems can be used to focus a beam from a laser source into an oblong focused beam spot 52. Combinations of cylindrical, elliptical, parabolic or other reflective focusing optics may be used to produce the desired oblong focused spot shape, including linear and generally rectangular focused beam spot shapes. Other beam optics delivery systems using lenses instead of reflective optics or a combination of lenses and reflective optics can be used to produce the desired oblong focused beam spot 52. Furthermore, the beam delivery system can utilize a fiber optic beam delivery system or a beam delivery system using a waveguide apparatus.

Although, the axis of the beam for these beam optics delivery systems can be angled relative to the sheets or workpiece, such as is shown in FIG. 18, for at least the beam optics delivery systems 120, 140, & 160 shown respectively in FIGS. 14, 15, & 16, the axis of the focused beam 48 can be and preferably is generally perpendicular to the sheet, sheets or workpiece. If the axis of the focused beam 48 is angled relative to the sheet, sheets or workpiece, it is preferably angled within a range of ±15° from a direction generally perpendicular to the sheet, sheets or workpiece being welded.

Use and Operation

In use, the method of welding of this invention is used to join one sheet positioned and oriented in close proximity to another sheet using a laser or electron beam having an oblong focused beam spot shape where the beam impinges on at least one of the sheets for reducing power density at the beam spot while increasing exposure time to beam energy of the region of the sheet or sheets being welded for maximizing welding speed while minimizing welding defects, all while producing a weld of good integrity and high strength. Preferably, after welding, the sheets form a blank that can be formed or shaped.

In operation, two sheets 40 & 42 are oriented and positioned in close proximity to each other to form a weld joint, such as a lap joint, a butt joint, a T-joint, or another type of weld joint. After positioning the sheets 40 & 42 for welding, the sheets 40 & 42 are preferably fixtured, such as by clamps, pressure rollers or tension rollers, to maintain the sheets 40 & 42 in close proximity to each other during welding. If desired, the sheets 40 & 42 can be positioned to orient the weld interface 64 relative to the direction of gravity, $F_g$, so that any weld nugget of molten sheet material formed during welding will be influenced by the direction of gravity, $F_g$.

To weld the sheets 40 & 42, an incoming beam of high energy density radiation is focused into an oblong focused beam spot 52 preferably where the beam impinges against at least one of the sheets 40 & 42 to irradiate the sheet or sheets with energy from the focused beam. The focused beam is trained on at least one of the sheets and moved, relative to the sheets 40 & 42, along the weld line 60 preferably formed at the weld interface 64 of the sheets 40 & 42 to fuse and weld the sheets 40 & 42 together.

When welding is completed, a weld of good integrity, high tensile strength and high fatigue strength joins the sheets 40 & 42 together. Preferably, after welding is completed, the welded sheets 40 & 42 form a blank 62 that can be shaped or formed using conventional shaping or forming methods. If the weld is a lap weld, the weld preferably also possesses high peel strength so that the sheets 40 & 42 resist peeling apart from each other in the weld region, particularly during forming or shaping the sheets 40 & 42.

What is claimed is:

1. A method of welding using a high energy density radiation beam comprising the steps of:

(a) providing 1) a pair of sheets to be welded together with the sheets being constructed of a material having a $P_{dens\ min}$ characteristic value with $P_{dens\ min}$ being the minimum average power density of a high energy density radiation beam focused as a beam spot on at least one of the sheets necessary to achieve deep penetration keyhole welding for the type of sheet material being welded in Watts per square centimeter, 2) a high energy density radiation beam source capable of generating a high energy density radiation beam having an average power, P, of at least one kilowatt and which is great enough to achieve deep penetration keyhole mode welding for the material being welded, and 3) a beam delivery system capable of focusing the beam into an oblong shaped spot onto at least one of the sheets;

(b) positioning one sheet in close proximity to the other sheet forming a weld line;

(c) focusing the high energy density radiation beam into an oblong focused beam spot shape having a longitudinal length, L, in millimeters, and a width, w, in millimeters, such that the focused beam spot width, w, satisfies:

$$w^2 \leq (P \div 15)*(10^6 \div P_{dens\ min})$$

and the length, L, of the oblong focused beam spot is within the following limits:

$$1.5\ w \leq L \leq (P \div w)*(10^5 \div P_{dens\ min})$$

(d) training the oblong focused beam spot onto at least one of the sheets for welding the one sheet to the other sheet, and wherein a longitudinal axis of the oblong focused beam spot is acutely angled within the range of ±45° from a direction parallel to a direction tangent to the weld line; and (e) moving the beam relative to at least one of the sheets in a welding direction along the weld line at a welding speed of at least two meters per minute.

2. The method of claim 1 wherein the length, L, of the oblong focused beam is within the following limits:

$$1.5\ w \leq L \leq \frac{P}{w} * \frac{0.5 * 10^5}{P_{dens\ min}}.$$

3. The method of claim 1 wherein the high energy density radiation beam is an electron beam.

4. The method of claim 1 wherein the high energy density radiation beam is a laser beam.

5. The method of claim 1 wherein a longitudinal axis of the oblong focused beam spot is generally tangent to the weld line.

6. The method of claim 1 wherein a longitudinal axis of the oblong focused beam spot is generally tangent to a weld interface of the sheets.

7. The method of claim 6 wherein a longitudinal axis of the oblong focused beam spot is acutely angled within the range of ±10° of the tangent to the weld direction.

8. The method of claim 1 wherein the beam is focused into a generally rectangular focused beam spot shape and the generally rectangular focused beam spot is irradiated onto at least one of the sheets during step (d).

9. The method of claim 1 wherein the high energy density radiation beam source is a laser emitting a pulsed laser beam and having the duty cycle of pulsing being a duty cycle of at least 50%.

10. The method of claim 1 wherein the high energy density radiation beam source is a laser operating in a rippled or modulated mode having a continuous laser beam component with an average output power of at least 80% of the peak power of the laser.

11. The method of claim 1 wherein the beam spot where focused on at least one of the sheets has a power density, of at least $10^5$ watts per square centimeter.

12. The method of claim 1 wherein during step (a) the sheets are positioned in overlapping relationship to form a lap joint.

13. The method of claim 1 wherein during step (a) the sheets are positioned with a sheet edge of one sheet facing a sheet edge of the other sheet to form a butt joint.

14. The method of claim 1 wherein the high energy density radiation beam source is a laser emitting a pulsed laser beam having a number of pulses per second, f, a total dwell time per pulse, d, and a welding speed, V, satisfying the following conditions:

$$(V \div f) \leq ((L \div w)*(0.1\ mm) + (V*d)$$

wherein V is in millimeters per second, f is in $s^{-1}$, d is in seconds, L is in millimeters, and w is in millimeters.

15. The method of claim 1 wherein the oblong focused beam spot is trapezoidal, linear, or generally tear-drop shaped.

16. The method of claim 1 wherein the welding direction is generally parallel to the weld line.

17. The method of claim 1 wherein each sheet is constructed of steel, a steel alloy, aluminum, or an aluminum alloy having a thickness of at least about 0.5 millimeters.

18. The method of claim 17 wherein each sheet has a thickness of no greater than about 5 millimeters.

19. The method of claim 18 wherein after step (e) further comprising the step of forming or shaping at least one of the sheets.

20. The method of claim 1 wherein the power density of the oblong focused beam spot is at least about $10^5$ watts/cm$^2$.

21. The method of claim 20 wherein the power density of the oblong focused beam spot is no greater than about $10^7$ watts/cm$^2$.

22. The method of claim 20 wherein the welding speed is at least about 3 meters per minute.

23. The method of claim 22 wherein the welding speed is at least about 6 meters per minute.

24. The method of claim 1 wherein after step (e) the sheets are joined together by a weld and the beam spot is oscillated about an axis of the beam spot (1) for increasing the width of the weld, or (2) for initiating melting-solidification, remelting-resolidification cycles to release gas from the weld to prevent gases from being trapped in the weld.

25. The method of claim 24 wherein the path of travel of the beam spot is overlapped upon itself for initiating melting-solidification, remelting-resolidification cycles.

26. The method of claim 1 wherein V, L, and w are selected to satisfy:

$$V*(w \div L) \leq 10\ \text{meters/min}$$

wherein V is in meters per minute, and w and L are in millimeters.

27. The method of claim 1 wherein L, w, and P are selected to satisfy:

$$w^2 \leq (P \div 1.5)\ \text{and}\ 1.5\ w \leq L \leq (P \div w)$$

wherein P is in kilowatts, w is in millimeters and L is in millimeters.

28. A method of welding using a high energy density radiation beam comprising the steps of:

(a) providing 1) a pair of sheets to be welded together, 2) a high energy density radiation beam source capable of generating a high energy density radiation beam having an average power, P, of at least about one kilowatt, and 3) a beam delivery system capable of focusing the beam into an oblong shape and onto at least one of the sheets;

(b) positioning one sheet in close proximity to the other sheet, forming a weld line;

(c) focusing the high energy density radiation beam into an oblong focused beam spot impinging against at least one of the sheets with the oblong focused beam spot having a longitudinal length, L, that is greater than its width, w, at its smallest dimension of its width, w, such that $L \geq 1.5\,w$;

(d) selecting P, L and w such that the focused oblong beam spot has a power density, defined as the amount of energy per unit area where the oblong beam impinges against at least one of the sheets, that is large enough to achieve deep penetration keyhole mode welding wherein the power density of the oblong focused beam spot is approximated by the result of:

$$\text{power density} = (P*10^5) \div (w*L)$$

wherein the power density is in Watts/cm$^2$, P is in kilowatts, to achieve keyhole welding and w and L are in millimeters;

(e) training the oblong focused beam spot onto at least one of the sheets for welding one sheet to the other sheet, with the focused beam spot oriented relative to the weld line such that a longitudinal axis of the focused beam spot is substantially parallel to a direction tangent to the weld line; and (f) moving the beam relative to at least one of the sheets in a welding direction along the weld line at a welding speed, V, of at least about two meters per minute.

29. The method of claim 28 wherein L and w are selected to satisfy:

$$w^2 \leq (P \div 15)(10^6 \div P_{dens\,min}) \text{ and } 1.5\,w \leq L \leq ((P \div w)(10^5 \div P_{dens\,min}))$$

wherein $P_{dens\,min}$ is the minimum average power density of the oblong focused beam spot, in Watts per square centimeter necessary to achieve formation of deep penetration keyhole mode welding during welding the sheets together.

30. The method of claim 28 wherein the high energy density radiation beam is comprised of one or more laser beams having a total combined average power of at least about 3 kilowatts.

31. The method of claim 28 wherein the welding speed, V, is at least about 6 meters/minute.

32. The method of claim 28 wherein laser power, P, is at least about 6 kilowatts.

33. The method of claim 28 wherein V, L and w are selected to satisfy:

$$V*(w \div L) \leq 10 \text{ meters/minute}$$

wherein V is in meters per minute, and w and L are in millimeters.

34. The method of claim 28 wherein V, L and w are selected to satisfy:

$$V*(w \div L) \leq 6 \text{ meters/minute}$$

wherein V is in meters per minute, and w and L are in millimeters.

35. The method of claim 28 wherein a longitudinal axis of the oblong focused beam spot is acutely angled with the range of about ±45° of a tangent to the weld line.

36. The method of claim 28 wherein the power density of the focused beam spot is at least about $10^5$ Watts/cm$^2$ for achieving deep penetration keyhole mode welding.

37. The method of claim 28 wherein the length, L, of the oblong focused beam spot is equal to or greater than about twice the width, w, of the oblong focused beam spot.

38. The method of claim 28 wherein the power density of the oblong focused beam spot where focused on at least one of the sheets is no greater than about $10^7$ Watts/cm$^2$.

39. The method of claim 28 wherein L, w and P are selected to satisfy:

$$w^2 \leq (P \div 1.5) \text{ and } 1.5\,w \leq L \leq (P \div w).$$

40. The method of claim 28 wherein the length, L, of the oblong focused beam spot is at least about twice the width, w, of the oblong focused beam spot.

41. The method of claim 28 wherein the longitudinal power density distribution of the oblong focused beam spot is at least about $10^5$ Watts/cm$^2$ substantially along the longitudinal length, L, of the oblong focused beam spot.

42. The method of claim 28 wherein the oblong focused beam spot is formed by a single beam impinging against one or more sheets.

* * * * *